(12) United States Patent
Shivers et al.

(10) Patent No.: US 8,311,938 B2
(45) Date of Patent: Nov. 13, 2012

(54) PROVIDER RELATIONSHIP MANAGEMENT SYSTEM THAT FACILITATES INTERACTION BETWEEN AN INDIVIDUAL AND ORGANIZATIONS

(75) Inventors: Steve Shivers, Seattle, WA (US); Roger Parks, Seattle, WA (US); Mark Goris, Seattle, WA (US)

(73) Assignee: Doxo, Inc., Seattle, WA (US)

( * ) Notice: Subject to any disclaimer, the term of this patent is extended or adjusted under 35 U.S.C. 154(b) by 182 days.

(21) Appl. No.: 12/712,181

(22) Filed: Feb. 24, 2010

(65) Prior Publication Data

US 2010/0250433 A1     Sep. 30, 2010

Related U.S. Application Data

(60) Provisional application No. 61/155,121, filed on Feb. 24, 2009.

(51) Int. Cl.
  *G06Q 40/00*        (2006.01)
(52) U.S. Cl. ............................................. 705/39; 705/30
(58) Field of Classification Search ........... 705/1, 10–44
  See application file for complete search history.

(56) References Cited

U.S. PATENT DOCUMENTS

| | | | |
|---|---|---|---|
| 6,629,081 B1 * | 9/2003 | Cornelius et al. ............... | 705/30 |
| 6,690,773 B1 | 2/2004 | Law | |
| 7,058,586 B1 | 6/2006 | Law | |
| 7,478,140 B2 | 1/2009 | King et al. | |
| 7,769,606 B2 | 8/2010 | Boone et al. | |
| 7,788,120 B2 | 8/2010 | Mathias et al. | |
| 7,899,689 B1 | 3/2011 | Wizig | |
| 7,962,470 B2 | 6/2011 | Degenkolb et al. | |
| 8,060,394 B2 * | 11/2011 | Woodings et al. ........... | 705/7.13 |
| 8,068,980 B2 | 11/2011 | O'Clair | |
| 2002/0002475 A1 | 1/2002 | Freedman et al. | |
| 2002/0007309 A1 | 1/2002 | Reynar | |
| 2002/0082895 A1 * | 6/2002 | Budka et al. ....................... | 705/9 |
| 2003/0078874 A1 * | 4/2003 | Cope ............................... | 705/37 |
| 2003/0191711 A1 | 10/2003 | Jamison et al. | |
| 2003/0225632 A1 | 12/2003 | Tong et al. | |
| 2004/0059636 A1 * | 3/2004 | McClung et al. ............... | 705/26 |
| 2005/0097061 A1 * | 5/2005 | Shapiro et al. .................. | 705/67 |
| 2005/0265232 A1 | 12/2005 | Tanabe | |
| 2006/0123346 A1 | 6/2006 | Totman et al. | |
| 2007/0038628 A1 | 2/2007 | Eckert et al. | |

(Continued)

OTHER PUBLICATIONS

International Search Report and Written Opinion in Internation Application No. PCT/US10/25288 dated Apr. 12, 2010.

(Continued)

*Primary Examiner* — Frantzy Poinvil

(74) *Attorney, Agent, or Firm* — Perkins Coie LLP

(57) ABSTRACT

A provider relationship management system ("PRM system") is disclosed that enables an individual to manage information about and electronically interact with organizations. The PRM system presents an individual with a list of organizations that the individual may have a relationship with. The individual selects one or more organizations from the list to add the selected organizations to a personal provider directory. The individual uses the personal provider directory to manage information associated with each organization. The individual may seek to establish an interactive connection with one or more organizations in the personal provider directory. If a selected organization agrees to establish an interactive connection with the individual, the organization is permitted to communicate with and send electronic documents to the individual. Each document is associated with a document type, and the document type is associated with certain actions that may be taken with respect to the corresponding document.

27 Claims, 16 Drawing Sheets

U.S. PATENT DOCUMENTS

| | | |
|---|---|---|
| 2007/0088571 A1 | 4/2007 | Susai et al. |
| 2007/0226374 A1 | 9/2007 | Quarterman et al. |
| 2007/0271138 A1 | 11/2007 | Van Der Linden et al. |
| 2007/0288364 A1* | 12/2007 | Gendler .......................... 705/39 |
| 2008/0104118 A1 | 5/2008 | Pulfer et al. |
| 2008/0228671 A1* | 9/2008 | Nagaraj ........................ 705/500 |
| 2008/0235319 A1 | 9/2008 | Zargham et al. |
| 2008/0243600 A1 | 10/2008 | Lin |
| 2008/0253545 A1 | 10/2008 | Gleichauf |
| 2009/0125320 A1 | 5/2009 | Bickett |
| 2009/0132370 A1 | 5/2009 | Peshkam |
| 2010/0211515 A1* | 8/2010 | Woodings et al. ............ 705/320 |
| 2011/0022536 A1 | 1/2011 | Shivers et al. |
| 2011/0047147 A1 | 2/2011 | Shivers et al. |
| 2011/0202437 A1* | 8/2011 | Nambiar et al. ................ 705/30 |
| 2011/0218912 A1 | 9/2011 | Shivers et al. |

OTHER PUBLICATIONS

Non-Final Office Action for U.S. Appl. No. 12/766,805, Mail Date Dec. 14, 2011, 23 pages.

* cited by examiner

*FIG. 6A* doxo

Overview | To Do | File Cabinet

Add/Manage Providers→
ALL PROVIDERS
Allied Waste LLC
  Waste Sewer
AT&T ～647
  Mobile Phone ～648
Bank of America Corp
  Checking, Savings
Chase (JP Morgan)
  Personal Card
Delta Air Lines
  Airline Program
Fidelity Investments
  IRA/401k
First Tech Credit Un...
  Checking, Savings
Liberty Mutual Insur...
  Auto, Home / Rental
Premera Blue Cross
  Health Insurance
Puget Sound Energy
  Gas, Electric
Qwest Communicat...
  Cable/Satellite, Internet
Time Warner Cable
  Mobile Phone, cable/Sa...
Vanguard
  IRA/401k

TIME WARNER CABLE
THE POWER OF YOU

Added to your directory: 2010-02-04
Your label: Mobile Phone, Cable/Satellite, Internet, Home Phone
Time Warner Cable is not on the doxo Network.

60 Columbus Cir #17    Phone: 866-625-5007
New York, NY 10023 www.timewarnercable.com/

Inaccurate information in this listing? Please let us know.

My Account Info

My Secure Account Info ～642
Store sensitive information related to your Time Warner Cable account here. This information will be securely stored for your safety.

My Other Account Info ～644
Personalize your Time Warner Cable page by adding your account info.

My Notes  edit ～646
Use this space to keep notes regarding your relationship with Time Warner Cable.

UPLOAD
Upload a document

The information in this doxo Directory listing is collected from public sources for the convenience of doxo users.
Errors may exist. Trademarks shown are the property of their respective owners. No endorsement has been given nor is their endorsement implied.

PROVIDER RELATIONSHIP MANAGEMENT SYSTEM THAT FACILITATES INTERACTION BETWEEN AN INDIVIDUAL AND ORGANIZATIONS

CROSS-REFERENCE TO RELATED APPLICATION(S)

This application claims the benefit of U.S. Provisional Application No. 61/155,121, filed on Feb. 24, 2009, which is incorporated herein by reference in its entirety.

BACKGROUND

Organizations have traditionally communicated with their customers by mailing documents through the postal service. Mailing documents has proved reliable and relatively convenient for organizations. A credit card company, for example, can send a bill through the mail and trust that it will be delivered securely to its customer. The customer can, in turn, mail a check back to the credit card company to pay the bill. However, advances in technology have rendered the postal service relatively expensive and inefficient. Now, many organizations electronically make important documents available to individuals via the Internet, instantly and at a fraction of the cost of traditional mail. Most organizations that make documents available electronically for individuals host the documents on a website that the individual accesses. Some websites allow an individual to register with the website to receive personal information and documents from an organization. For example, a bank's customer can view a statement or transfer money by logging into the bank's website.

Although it is convenient and inexpensive for an organization to electronically send documents to an individual, existing electronic systems lack many of the advantages that the postal service offers its customers. For example, using the postal service, an individual receives correspondence from multiple organizations at one central address associated with the individual. However, if multiple organizations send documents to an individual through their websites, it becomes cumbersome for the individual to receive each document because each organization typically has a separate website that the individual must access. Additionally, while an email address acts as a central destination for multiple organizations to send documents to, an individual cannot securely transfer money over email in response to a document or manage an account with an organization from within an email program.

BRIEF DESCRIPTION OF THE DRAWINGS

FIGS. 6A-B are representative user interfaces that are generated by the provider relationship management system to allow an individual to utilize his or her personal provider directory and input secure account information.

FIG. 9 is a representative user interface that is generated by the provider relationship management system depicting a document review list.

DETAILED DESCRIPTION

Figure 1:
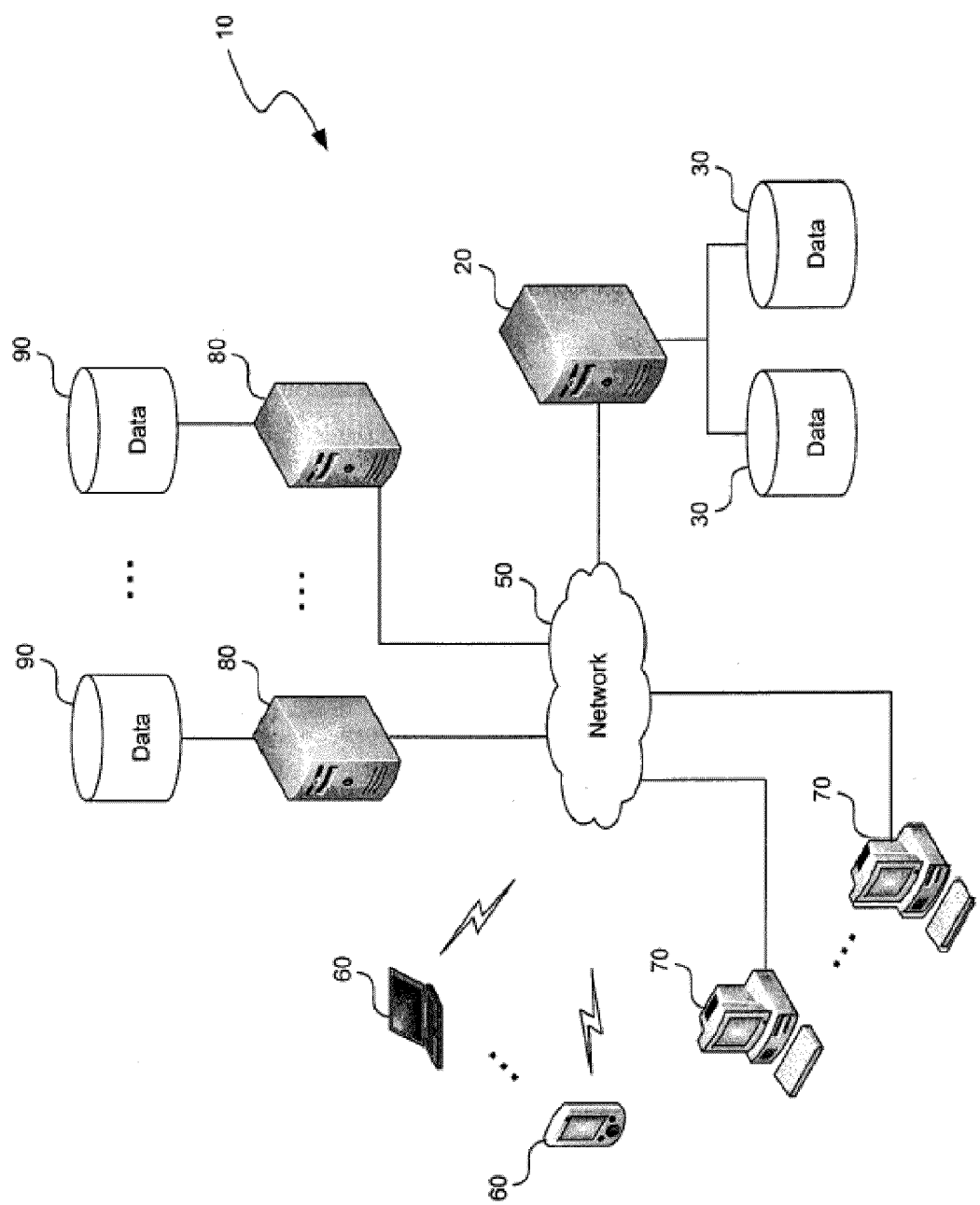
FIG. 1 is a diagram of a suitable environment in which a provider relationship management system ("PRM system") operates.

A provider relationship management system ("PRM system") is described that enables an individual to manage information about and electronically interact with one or more organizations with which the individual has a relationship. An organization is a corporation, group, or other entity that is comprised of two or more people. For example, an organization may be a for-profit corporation, a non-profit corporation, a government agency, an educational institution, a community group, etc. The provider relationship management system presents an individual with a list of organizations that the individual may have a prior, existing, or future relationship with. The individual selects one or more organizations from the list to add the selected organizations to a personal provider directory that is associated with that individual. The individual uses the personal provider directory to manage information associated with each organization (e.g., account numbers, contact information, transaction notes, etc.). Maintaining information about all organizations in a common location greatly simplifies the task for an individual to manage his or her relationship with organizations.

In some embodiments, the provider relationship management system modifies the list of organizations presented to the individual by comparing data characterizing the individual with data characterizing the organizations in the list. The PRM system tailors the list by moving one or more organizations higher in the list if it determines that the individual is likely to want to add the organization to his or her personal provider directory. In some embodiments, the PRM system tailors the list based on geography, such as by moving an organization up the list if a zip code associated with the organization is proximate to a zip code associated with the individual. In some embodiments, the PRM system tailors the list based on popularity, such as by promoting an organization that has been frequently added to personal provider directories of other individuals. In some embodiments, the PRM system tailors the list based on a type of organization, such as by moving an organization up the list if it is a banking institution and the individual has not yet established an interactive connection with a bank. In some embodiments, the PRM system tailors the list based on a demographic attributed to the individual, such as by moving an organization up the list if its target demographic is middle-aged men and the individual is a middle-aged man. In some embodiments, the PRM system tailors the list based on a list supplied by an organization, such as by moving an organization up the list if the organization has already identified that it has a relationship with the individual.

If an organization that is added to an individual's personal provider directory has agreed to participate in the provider relationship management system, the PRM system provides the individual with an option to establish an interactive connection with the organization. An interactive connection allows the organization and the individual to electronically exchange information and perform certain transactions. Before an interactive connection is formed, however, the organization must also agree to the establishment of the connection. If a selected organization agrees to establish the interactive connection with the individual, the organization is permitted to communicate with and send electronic documents to the individual. Each document is associated with a document type, and the document type is associated with certain actions that may be taken with respect to the corresponding document. An individual can take any action with respect to a document that is permitted by the document's type. In some embodiments, once an interactive connection is established between an individual and an organization, the parties may communicate and otherwise interact in a number of other ways, such as videoconferencing, chatting, emailing, or teleconferencing, or sending updates, documents, payment, or offers to one another. Allowing an organization and an individual to interact electronically allows the organization to cease sending paper correspondence to the individual, thereby saving money while at the same time increasing reliability and satisfaction of the individual.

In some embodiments, if an organization does not yet participate in the provider relationship management system, the individual is still allowed to store information in his or her personal provider directory about the organization. If a number of individuals store information about the same organization in their personal provider directories, the PRM system may interpret such actions as interest for the organization to participate in the PRM system. The provider relationship management system may therefore invite the organization to join the PRM system.

In some embodiments, the document types include a pay document, a review document, a respond document, and an offer document. A pay document, such as a bill, is a demand from an organization that an individual pay money to the organization or to another organization. A review document, such as a receipt or tax statement, is a request from an organization that an individual review information. A respond document, such as a form, is a request from an organization that an individual send information to the organization. An offer document, such as an advertisement for services, is an offer from an organization that an individual can accept or act upon. In some embodiments, an organization can send two or more documents to an individual as a package. In some embodiments, two or more organizations send a common package to an individual. In some embodiments, an individual can set a rule related to an organization or to a document type that the provider relationship management system must follow, such as automatically paying a pay document when it is received by an individual.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 depicts an environment in which a provider relationship management system ("PRM system") 10 operates. The provider relationship management system operates on one or more servers 20 or other computing devices that have a processor and a memory. The servers 20 are connected to one or more data storage areas 30. Data storage areas 30 contain data pertaining to the PRM system, such as data related to individuals and organizations that participate in the PRM system and data establishing interactive connections between individuals and organizations. Data storage areas 30 also contain software routines necessary to implement the technology disclosed herein. The data may be tangibly stored in any computer storage medium, such as hard drives, optical drives, tape drives, flash memory, etc.

The provider relationship management system 10 generates a user interface that allows an individual to establish an interactive connection with one or more organizations. An organization is a corporation, group, or other entity that is comprised of two or more people. For example, organizations include for-profit corporations, non-profit organizations, limited liability companies, government agencies and offices (e.g., the Federal Student Aid office of the United States Department of Education), community groups (e.g., athletic teams and neighborhood watch programs), and less formal associations of people (e.g., book clubs and support groups). An individual's relationship with an organization is a connection that the individual has with the organization. The nature of the relationship is determined by the organization, the individual, and/or other sources, such as statutes. For example, an individual's relationship with a credit card company may be formally defined by a credit card agreement between the credit card company and the individual, as well as any applicable Federal or local statues. In contrast, an individual's relationship with a sports club may be defined by the sports club members' informal oral agreement to share costs and other responsibilities.

An individual may access the provider relationship management system 10 via mobile devices (e.g., personal digital assistants (PDAs), smart phones, tablet computers, portable computers, etc.) 60 or computers (e.g., personal computers, laptop computers, network devices, etc.) 70 that communicate with servers 20 through public or private networks 50, such as the Internet. The provider management system 10 also communicates through public or private networks 50 with servers 80 and data areas 90 associated with organizations.

Those skilled in the art will appreciate that the provider relationship management system 10 may be implemented on any computing system. Suitable computing systems include personal computers, server computers, multiprocessor systems, microprocessor-based systems, minicomputers, mainframe computers, distributed computing environments that include any of the foregoing, and the like. Such computing systems may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

Figure 2:
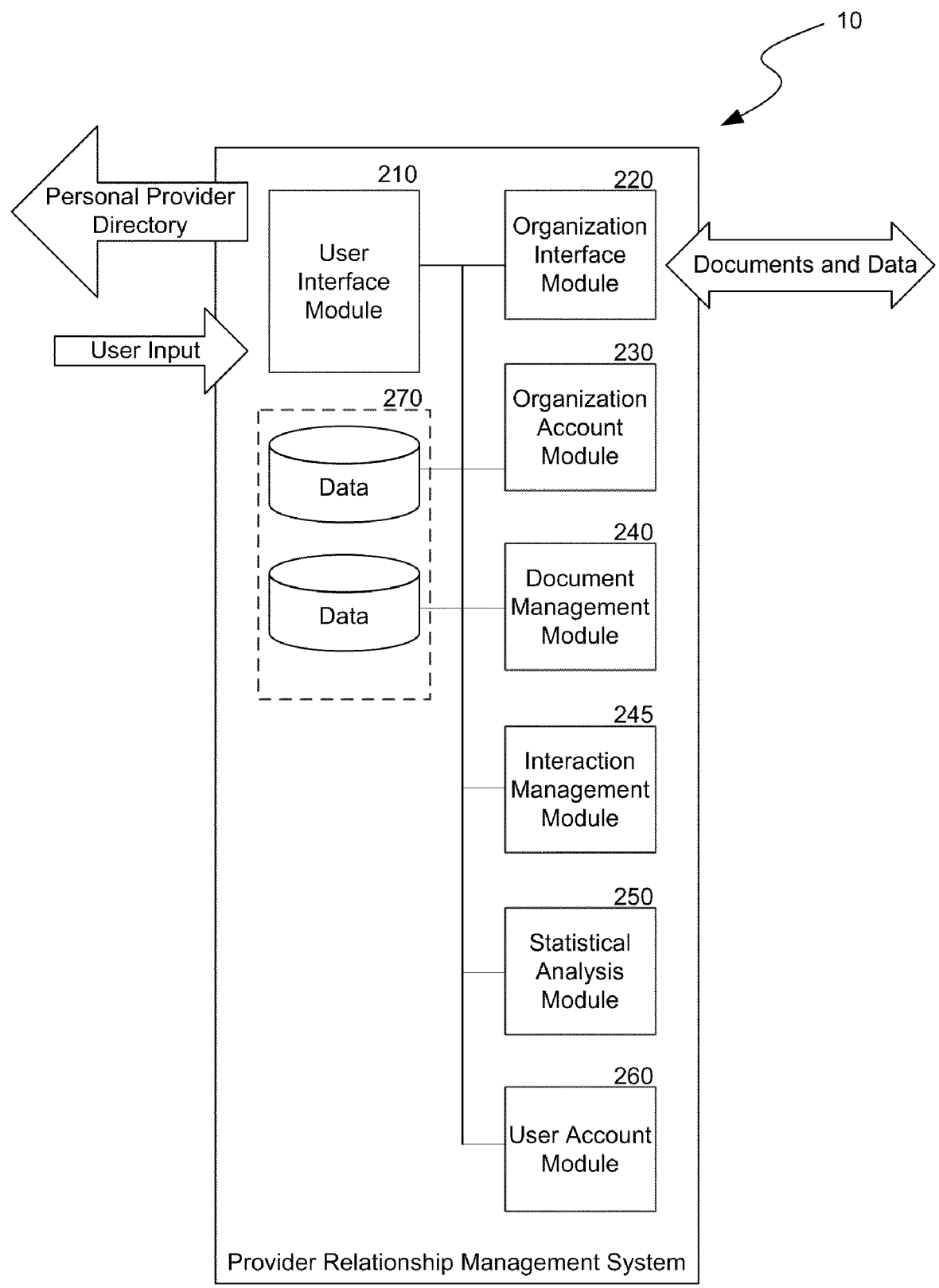
FIG. 2 is a block diagram of the provider relationship management system.

FIG. 2 is a block diagram of the various modules contained in the provider relationship management system 10. The provider relationship management system 10 allows an individual to manage information associated with organizations with which they have a relationship, as well as to establish interactive connections with organizations provided that both the individual and organization agree to the connection. If an interactive connection is established between an individual and an organization, the organization may communicate with and send documents to the individual. Upon receiving a document, an individual may take action with regard to the document. Depending on an action taken by an individual, the provider relationship management system 10 also communicates with external systems and/or data areas associated with the organization.

The provider relationship management system 10 generates various user interfaces through which an individual and an organization interact with the PRM system 10 and with each other. The provider relationship management system 10 includes a user interface module 210, an organization interface module 220, an organization account module 230, a document management module 240, an interaction management module 245, a statistical analysis module 250, a user account module 260, and a data storage area 270, each of which will be described in turn herein. The user interface module 210 generates a user interface that allows an individual to access the PRM system and manage communications and other interactions with one or more organizations. The user interface module receives commands from the individual, and stores data input by the individual or outputs stored data to the individual. The user interface module 210 reads data from and writes data to the data storage area 270.

The organization interface module 220 allows organizations to send data to the provider relationship management system 10, and receive or access data maintained by the PRM system. Organizations may access the PRM system, for example, via an application programming interface (API). The organization interface module 220 may also allow the PRM system to access data that is related to an organization over a network, such as on a server that hosts an organization's website. The organization interface module 220 also stores data in and accesses data from the data storage area 270.

The organization account module 230 manages data associated with an organization, such as data characterizing an organization or data characterizing an organization's relationship with an individual. The organization account module receives data associated with an organization from the organization itself, from industry or third-party resources, or from individuals having a connection with the organization. In some embodiments, individuals are allowed to add information about organizations that are not currently associated with the PRM system. The organization account module 230 is configured to execute an individual's keyword search or browse inquiry to find one or more organizations that are responsive to the individual's query. The organization account module 230 is also configured to modify a list of identified organizations so that the list is tailored to the requesting individual. For example, an individual may request to view a list of banks that participate in the PRM system. The organization account module 230 provides the user interface module 210 with a list of participating banks that is responsive to the individual's request, ranked according to the anticipated preferences of the individual.

The document management module 240 delivers documents from an organization to an individual that has established an interactive connection with that organization. A document is any electronic file or stream of data, including a .pdf file, a .jpg file, an .htm file, a .doc file, raw data, or the like. The document management module 240 receives documents from organizations via an API, or accesses and imports documents from systems and/or data areas of an organization. When a document is received, the document management module 240 stores the document and any metadata associated with the document in the data storage area 270. The document management module 240 also maintains a mapping of acceptable actions that are associated with each document. As explained in further detail below, each type of document has at least one action that is associated with that document type. An individual who receives a document can take any of the actions associated with the document. For example, an insurance company may deliver a bill to a policyholder through the PRM system. The document management module 240 may provide three actions for the user to take with the bill, namely to pay the bill, to file the bill, or to discard the bill.

The interaction management module 245 manages and processes all interactions that occur between an individual and an organization. As will be described herein, such interactions include any communications between the individual and organization, such as by videoconferencing, chatting, emailing, teleconferencing, or exchange of documents and offers. The interaction management module may store a record of all communications between an individual and an organization, and allow the individual or organization to access the stored record of communications in the future. The interaction management module 245 may also be configured to allow financial interactions between the individual and the organization, such as by processing credit and debit card payments, wire transfers, or other electronic payments made by an individual or an organization. For example, an individual who interfaces with a bank and a credit card company through the PRM system can satisfy a credit card bill received from the credit card company by transferring money from his bank account to the credit card company. After the individual authorizes the transfer of money, the interaction management module 245 interacts with external payment services to debit the bank account and credit the credit card company account. Other interactions between an organization and individual, such as proxy voting, etc., may also be supported by the interaction management module 245.

The statistical analysis module 250 monitors use of the provider relationship management system and generates reports that characterize various aspects of the system operation as set forth herein. Such reports are provided, for example, to individual users to assist them in selecting organizations, and provided to organizations to enable the organizations to benchmark against others in their industry and improve the services that they provider to customers.

The user account module 260 manages information associated with an individual that uses the PRM system, such as account registration information that is provided by an individual, usage information that characterizes use of the PRM system by the individual, and information provided about an individual from an organization. The information characterizing an individual is used, among other purposes, to help an individual find and construct a personal provider directory as set forth in greater detail herein.

The data storage area 270 stores data associated with organizations, individuals, interactions, and an individual's relationship with an organization. The data storage area 270 also stores documents that the individual has received from an organization and data related to preferences towards or actions taken by the individual with respect to the received documents. The data storage area 270 also stores data associated with an organization's and an individual's use of the PRM system. Additionally, the data storage area 270 stores account information that is associated with an individual, such as login credentials, passwords, account names and numbers, phone numbers, physical addresses, email addresses, and the like.

I. Creation of a Personal Provider Directory

Figure 3:
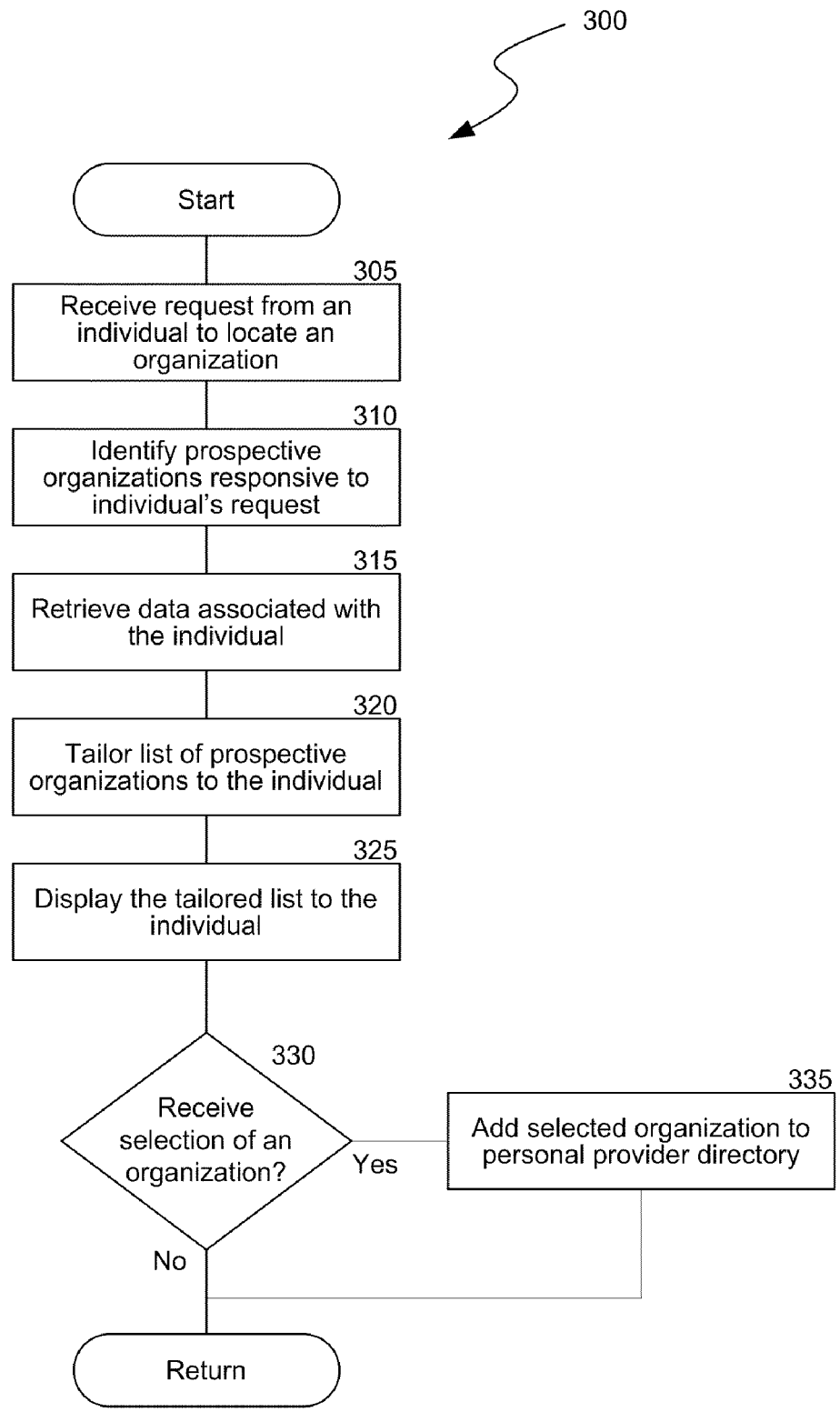
FIG. 3 is a flow diagram depicting steps performed by the provider relationship management system to tailor a list of organizations from which an individual can select an organization to establish an interactive connection.
Figure 4:
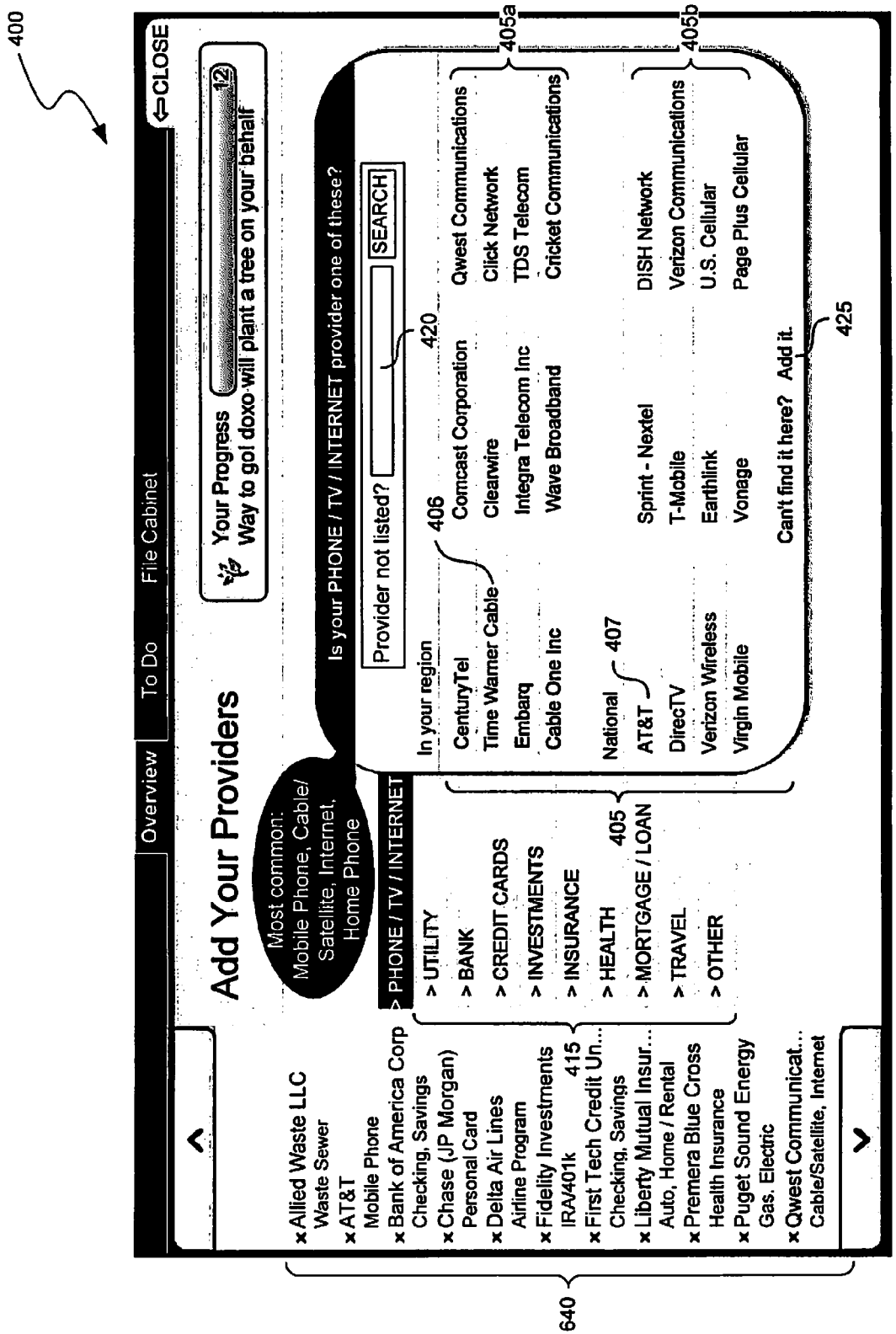
FIG. 4 is a representative user interface that is generated by the provider relationship management system to display a tailored list of organizations.

FIG. 3 is a flow diagram of a process 300 implemented by the provider relationship management system 10 to tailor a list of organizations to allow an individual to quickly and easily locate organizations to add to a personal provider directory. An individual's personal provider directory is a collection of all organizations that the individual has a relationship with and has indicated a desire to manage through the PRM system. FIG. 4 is a representative user interface 400 that is generated by the provider relationship management system 10 by the process 300. Using user interface 400, an individual is able to quickly build the user's personal provider directory and manage the individual's relationship with the organizations in that directory.

At a block 305, the provider relationship management system 10 receives a request from an individual to locate an organization that is to be added to the individual's personal provider directory. As depicted in FIG. 4, an individual may locate an organization in one of two ways. The individual may locate an organization by entering a search query into a search bar 420. For example, the individual may enter the name of an organization, a service or product provided by an organization, or other characterization of an organization. The individual may also locate an organization by browsing through a taxonomy of organizations. The user interface 400 includes a category menu 415 that shows category names associated with organizations that participate in the PRM system. The individual can select any of the category names to view participating organizations that are associated with the chosen category. For example, in the depicted example the individual has selected "Phone/TV/Internet" to show those organizations that offer or are associated with phone, TV, or Internet services. As will be discussed in greater detail herein, whether an individual submits a search query or browses using the organization taxonomy, the organizations that are presented in response to the inquiry are tailored to the requesting individual in order to present those organizations that are most likely to be selected by the individual.

Prior to searching for an organization, the individual may be required to create an account with the provider relationship management system 10. An individual creates an account by providing a user name or number and a password, and by providing personal and contact information that is stored in association with the individual's account. The personal and contact information may include, for example, the individual's name, a mailing address, a home phone number, a cellular phone number, an email address, and the like. In some embodiments, an individual may search for organizations before creating an account with the PRM system.

At a block 310, the provider relationship management system 10 identifies one or more prospective organizations that are responsive to the individual's search query or to the individual's browse command. In order to identify the organizations that are responsive to the individual's request, the PRM system accesses a database of organizations that is managed by the PRM system. The database of organizations includes a record of each organization that participates in the PRM system and organizations that the PRM system has identified but that do not yet participate in the PRM system, such as an organization that an individual has added to his or her personal provider directory despite the organization not participating in the PRM system. The organization record may include, for example, the organization's name, its address, its primary customer service number, its principal place of business, the location of branch offices, etc. The database of organizations also includes metadata that characterizes each organization so that queries may be run against the database to identify organizations that satisfy the request. The metadata may include, for example, an industry associated with the organization (e.g. those category or categories in the organization taxonomy that apply to the organization), a product or service offered by the organization, a clientele targeted by the organization, and the like. In response to an entered search request in search bar 420, the PRM system applies the entered search terms against the organization database to identify a list of prospective organizations that meet the search query. Alternatively, in response to a selected browse action via category menu 415, the PRM system identifies those organizations that are associated with the selected category. It will be appreciated that the list of prospective organizations that are identified by the provider relationship management system 10 may change over time as the PRM system adds or removes organizations as they join or leave participation with the PRM system, if an individual adds an organization to the PRM system, if an organization ceases to exist, or if an organization merges with or is acquired by another organization. Additionally, the list of prospective organizations may change as the scope of services that organizations provide changes, thereby necessitating a modification to the classification of the organizations maintained by the PRM system.

At a block 315, the provider relationship management system 10 retrieves data associated with the individual. The retrieved data characterizes the individual and may be derived from three sources. First, the retrieved data may have been provided by the individual during or after the registration process. Such information may include, for example, contact information that reflects the primary physical location of the individual, or age and income information that reflects a demographic of the individual. The data received from the individual is typically stored in the individual's account by the PRM system. Second, the retrieved data that characterizes the individual may reflect the individual's past use of the PRM system. For example, if an individual takes an action with respect to a document, the PRM system stores data associated with the action. Over time, the PRM system therefore builds a record of the preferences of the individual based on past actions of the individual using the system. Finally, the retrieved data that characterizes the individual may be provided by one or more organizations based on a past or present relationship with the individual. For example, a credit card company that interfaces with the individual may provide the PRM system a list of the individual's recent credit card purchases, or an insurance company that interfaces with the individual may provide the PRM system with personal or account information related to the individual. The data characterizing the individual may be stored locally in storage area 270, or accessed remotely from one or more locations.

At a block 320, the provider relationship management system 10 modifies the list of prospective organizations in order to create a tailored list of organizations that are presented to the individual. The tailored list is created by comparing the data associated with the organizations contained in the list to the data associated with the individual. The PRM system promotes those organizations in the list of prospective organizations that the PRM system believes are more likely to be relevant and/or selected by the individual, and demotes or removes those organizations in the list of prospective organizations that the PRM system believes are less likely to be relevant and/or selected by the individual. The tailoring of the list of prospective organizations may be based on one or more of the following factors:

Geography. The PRM system may move an organization higher on the list based on proximity to the individual. For example, an organization that has a branch office within a mile of the individual's home may be placed higher on the list than an organization whose closest branch office is 50 miles from the individual. As another example, the PRM system may place a first organization higher on the list than a second organization if the individual lives in a region that the first organization targets through advertisements and the second organization does not.

Popularity. The PRM system may move an organization higher in the list because of a popularity of the organization. The PRM system determines that an organization is more popular than another using data it collects while managing the PRM system and from data it gathers from other sources, such as from industry rankings of size, reach, or popularity. An organization's popularity can be determined objectively, such as based on a quantity of individuals who add the organization in their personal provider directory or establish an interactive connection with the organization using the PRM system, or it can be determined subjectively, such as based on market share reports from industry sources. As one example, an organization that has customers in the millions of individuals may be placed higher on the list than an organization that has customers in the thousands. As another example, the PRM system may place an organization higher on the list than another organization if the former has a higher ranking from individuals who already have established an interactive connection with the organization. Popularity may be segmented and measured based on certain geographies (e.g., national, regional, local) or market segments (e.g., by age, gender, etc.).

Demographics. The PRM system may move an organization higher in the list because it caters to a demographic that the individual belongs to. That is, the PRM system may move an organization up the list if it is related to a demographic associated with the individual, and may move an organization down on the list if it is not related to the demographic. For example, if a first organization advertises its products toward men and a second organization advertises its products toward women, and if the requesting individual is a man, the PRM system moves the first organization up the list and the second organization down the list.

Organization Indicates an Existing Relationship. The PRM system may move an organization higher in the list if the individual is recognized as already having a relationship with the organization outside of the PRM system. In some embodiments, organizations supply the PRM system a list of individuals with which they have an established relationship. The organizations may identify individuals using a user name, name, account number, social security number, address, or the like. When the PRM system recognizes that an individual that is searching for an organization is already contained on a list associated with that organization, the PRM system may promote the organization in the list or otherwise highlight (e.g., by underlining, bolding, different color) the believed existence of the relationship.

Comparison with Similarly-Situated Individuals. The PRM system may recognize a likely relationship between an individual and an organization because similarly-situated individuals have a relationship with that organization. For example, the PRM system may determine that people who bank with Bank of America and have a T-Mobile wireless phone will typically also have a relationship with Apple Computer. The PRM system may therefore promote Apple Computer on the list of organizations if it identifies an individual that meets the other identified characteristics.

In addition to promoting or demoting an organization based on one or more of the aforementioned factors, under certain circumstances the provider relationship management system 10 may also remove an organization from the list of prospective organizations. If an individual already has added an organization to the individual's personal provider directory, for example, the organization is removed from the prospective organizations list. In some embodiments, the PRM system removes an organization from the list based on a preference of the individual. For example, the individual may choose to not add companies outside of a geographic region to the individual's personal provider directory and may therefore specify that the PRM system remove all companies that fall outside of the geographic region from the list of prospective organizations.

It will be appreciated that various other rules may be applied by the PRM system when determining whether to promote or demote organizations to create a tailored list of organizations. For example, the PRM system may specify that a certain number of slots on the tailored list be targeted to an individual, while the remainder of the slots be filled with organizations that are presented in alphabetical order or ordered by size of the organization. One of the purposes of providing the tailored list is to allow an individual to locate a desired organization in a minimal amount of time and without undue effort, so various refinements may be made to the tailored list to improve the user experience.

At a block 325, after the provider relationship management system 10 has modified the list of prospective organizations to create a tailored list of organizations, the PRM system displays the tailored list to the individual. As depicted in FIG. 4, the tailored list is presented in list region 405. To reflect tailoring by geographic location, the list region 405 may be broken into local organizations 405*a* that focus on, or are located in, the territory containing the individual, and national organizations 405*b* that encompass a larger territory. The local organizations 405*a* have been ranked based on proximity to the individual (as determined, for example, based on the address of the individual in the individual's account) and the popularity of the listed organizations within the nearby region. The national organizations 405b have been ranked based on general popularity across the nation.

Figure 5A:
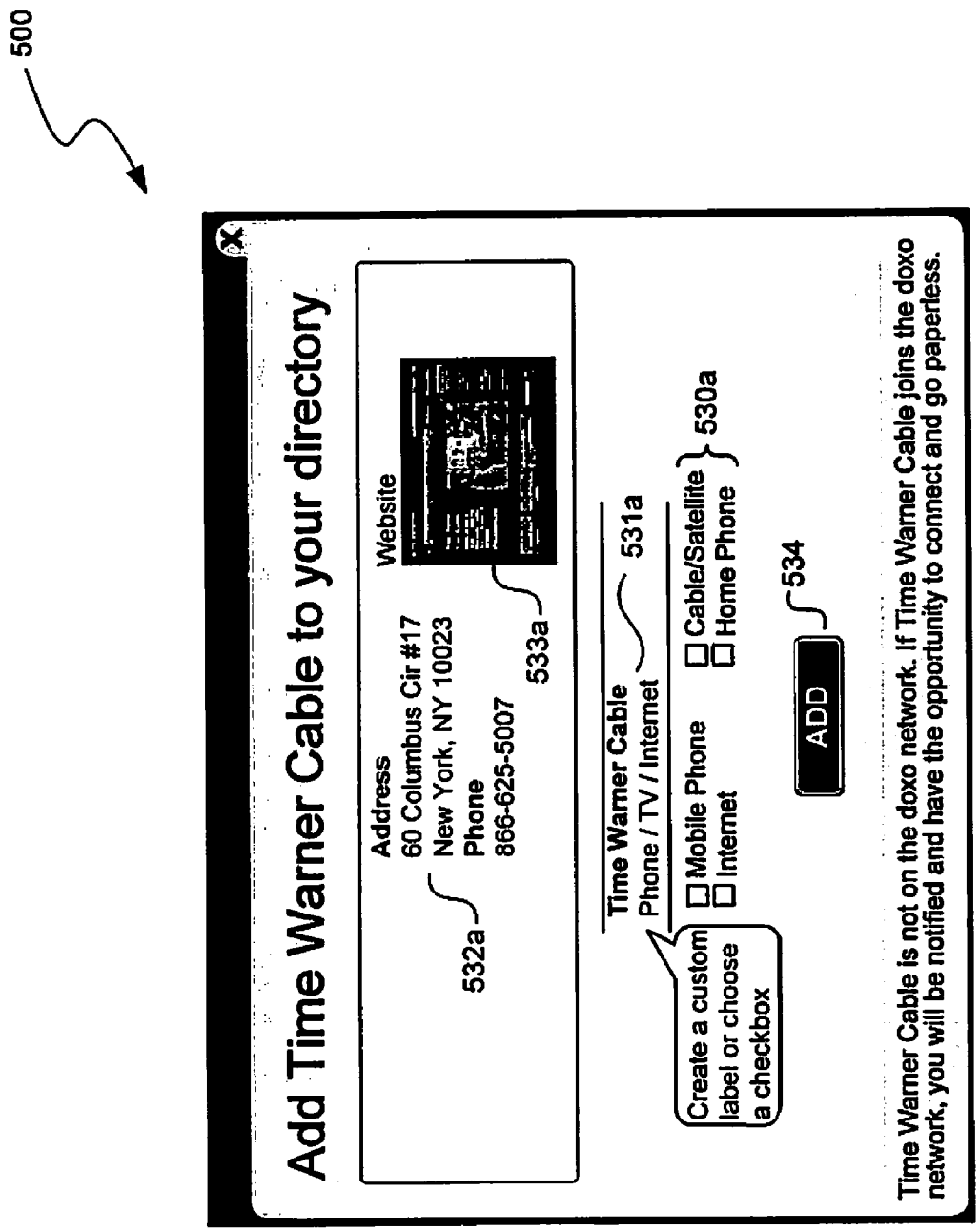
FIGS. 5A-C are representative user interfaces that are generated by the provider relationship management system to add an organization to an individual's personal provider directory and, in some cases, to establish an interactive connection between the individual and the organization.

The individual selects an organization from the tailored list 405 to add the organization to the individual's personal provider directory. If the selected organization participates in the PRM system, the individual may also seek establish an interactive connection with the organization at the same time. When the individual selects an organization from the tailored list 405, the provider relationship management system 10 generates an interface to allow the individual to confirm the selection and edit information about the organization. FIG. 5A is a representative user interface 500 that is generated by the PRM system to confirm an individual's desire to add an organization that does not participate in the PRM system to the individual's personal provider directory. In FIG. 5A, the individual has selected Time Warner Cable 406 from the tailored list 405. As depicted in FIG. 5A, Time Warner Cable does not yet participate in the PRM system. The PRM system displays an address and phone number 532a associated with Time Warner and a link 533a to a Timer Warner website. The individual chooses a label 531a for the organization by entering a custom label or by choosing a box from a check box area 530a. In some embodiments, the PRM system generates a text entry field in which an individual submits account information that is associated with the selected organization. To confirm that the organization should be added to an individual's personal provider directory, the individual selects an "add" button 534. If the individual does not want the organization added to the individual's personal provider director, the individual selects a "cancel" button (not shown).

In some embodiments, the PRM system 10 notifies an organization after a predetermined number of individuals have chosen to add the organization to their personal provider directories, even though the organization does not participate in the PRM system. For example, the operator of the PRM system may contact an organization and solicit them to utilize the PRM system when the number of individuals who add the organization to their personal provider directory exceeds a threshold number (e.g., tens, hundreds, or thousands of requests). Identifying organizations that should be added to the PRM system based on consumer demand is an efficient way to expand the reach of the PRM system in a manner that meets consumer need.

Figure 5B:
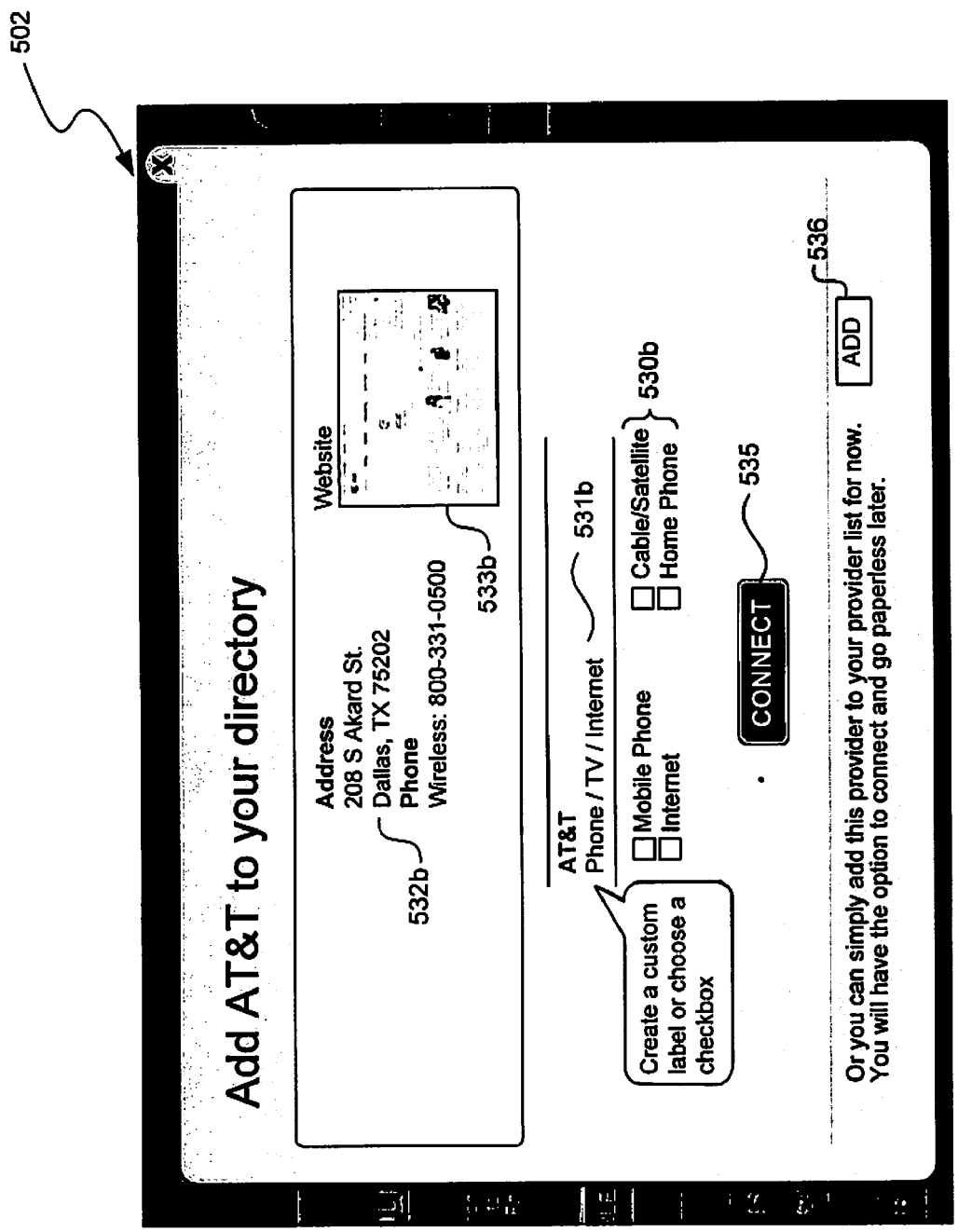

If the individual selects from the tailored list 405 an organization that does participate in the PRM system 10, the PRM system generates an interface to allow the individual to choose whether to establish an interactive connection with the selected organization or to merely add the organization to the individual's personal provider directory. FIG. 5B is a representative user interface 502 that is generated by the PRM system to confirm an individual's desire to establish an interactive connection with an organization. In the depicted example, the individual has selected AT&T 407 from the tailored list 405. The PRM system displays an address and phone number 532b associated with AT&T and a link 533b to an AT&T website, and allows the individual to choose a label 531b for AT&T by choosing a box from a check box area 530b or by entering a custom label. To confirm that an interactive connection should be requested with the organization, the individual selects a "connect" button 535. Selecting the connect button causes the PRM system to begin to formulate a request to the organization to establish an interactive connection, and also adds the organization to the individual's personal provider directory. To confirm that the organization should be added to the individual's personal provider directory but that an interactive connection with the organization should not be established, the individual selects an "add" button 536. If the individual does not want to establish an interactive connection with the organization and does not want the organization added to the individual's personal provider directory, the individual selects a "cancel" button (not shown).

In some embodiments, the PRM system may not display the connect button 535 to the individual even though an organization participates in the PRM system. For example, an organization or the operator of the PRM system may specify minimum criteria that an individual must meet in order for the individual to be allowed to establish an interactive connection with the organization. If an individual does not meet the specified criteria, the PRM system does not display the connect button 535 or allow the individual to request that an interactive connection be established with the organization. For example, an organization that is a wine distributor may specify that the PRM system not allow an individual who is under legal drinking age to establish an interactive connection with the organization. If an individual who is underage selects the wine distributor from the individual's personal provider directory, the PRM system does not display the connect button 535 or allow the individual to request an interactive connection with the wine distributor.

Figure 5C:
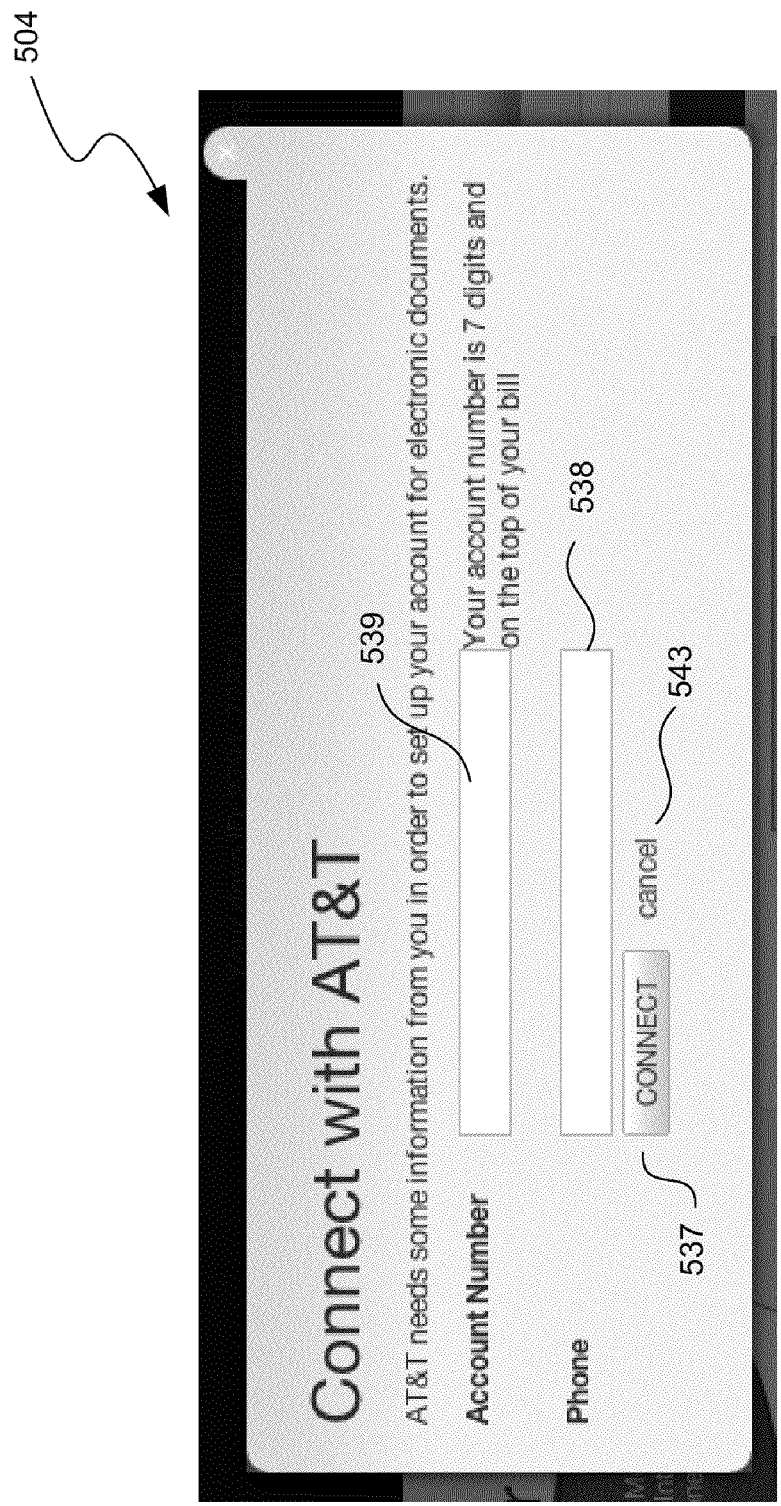

If an individual requests that an interactive connection be established with an organization, the PRM system 10 generates an interface to allow the individual to submit information that the organization can use to identify the individual's account with the organization and/or verify the individual's identity. The information that is submitted may vary for each organization, depending, for example, upon information that the organization requires. FIG. 5C is a representative user interface 504 that is generated by the PRM system to allow an individual to enter identification information and confirm the individual's desire to establish an interactive connection with an organization. The PRM system presents input fields to the individual, including an account number field 539 and a phone number field 538. The individual enters an account number in the account number field 539, a phone number in the phone number field 538, and selects a "connect" button 537 to transmit the entered information to the organization and request the establishment of an interactive connection with the organization. If the individual does not want to establish an interactive connection with the organization, the individual selects a "cancel" button 543. In some embodiments, the PRM system generates more, fewer, or different input fields depending on the organization that the individual is attempting to establish an interactive connection with. For example, the PRM system may generate a password field if the organization requires that an individual enter a password to establish an interactive connection with the organization.

After an individual selects an organization with which to establish an interactive connection, the organization must still approve of the individual before the interactive connection is created by the PRM system. Allowing the organization to approve of the establishment of a connection ensures that both parties are in agreement that the connection should be created. An organization may deny a request, for example, if the organization is unable to unambiguously correlate the identification information received from the individual (e.g., via the interface depicted in FIG. 5C) with individuals in the organization's records. An organization may also deny the request from individuals that don't have a current relationship with that organization, or individuals that don't meet one or more requirements held by the organization. By requiring both parties to approve of the creation of an interactive connection, organizations and individuals both benefit since the likelihood of unwanted communication or other interaction is greatly reduced.

It will be appreciated that the terms of service that an individual may be required to agree to in order to utilize the PRM system 10 can be drafted to create a binding agreement on the part of the individual to allow all subsequent communication from an organization to be made through the interactive connection once the interactive connection is established. That is, by agreeing to use the PRM system, the individual agrees that the organization may cease sending any documents to the individual in tangible form (e.g., via the postal service), and instead send all documents to the individual electronically. The terms of service may require the individual to hold the organization harmless for any future failure to send communications in tangible form.

An organization that denies an individual's request to establish an interactive connection may send a response to the individual through the PRM system 10 to explain why the request was denied. Additionally, if the individual's request was deficient in some manner, such as if the organization could not authenticate the individual's identity because it did not recognize an account number provided in the request, the organization may allow the individual to correct the deficiency and resubmit the request. For example, an organization may send an individual an email, chat message, video message, or the like, that details the organization's reason for denying a request from the individual. If the organization is willing to consider an amended or supplemented request from the individual, the PRM system 10 generates a user interface to allow the individual to enter additional information or to correct information provided in the individual's original request. For example, the PRM system may generate a user interface similar to the representative user interface 504 depicted in FIG. 5C. The individual may enter additional or corrected information and resubmit the request to establish an interactive connection with the organization. The organization must approve of the resubmitted request by the individual before the interactive connection is established.

In some embodiments, if an individual searches for an organization and does not find it in the tailored list 405, the individual may nevertheless be provided with an option by the PRM system to add the organization to the individual's personal provider directory. To add a new organization that is not currently found in the PRM system's organization database, a control 425 is provided by the PRM system that, when selected by an individual, allows the individual to specify information about the organization, such as its name, contact information, account numbers, etc., via a form (not shown). Providing information about an organization will not cause the PRM system to establish an interactive connection between the organization and the individual. Providing information does allow, however, the individual to generally manage his/her relationship with the organization, such as by tracking an account number, contact information, etc., of the organization. When an individual enters a new organization in this fashion, the PRM system may immediately add the new organization to the organization database for future access by other individuals. Alternatively, the PRM system may delay adding a new organization to the organization database until a threshold number of individuals (e.g., tens, hundreds) have added the same new organization to their own personal provider directories.

Once one or more organizations have been added to an individual's personal provider directory, the individual is allowed to manage his/her relationship with each organization through the directory. FIG. 6A is a representative user interface 600 generated by the provider relationship management system 10 that shows a personal provider directory 640. The personal provider directory 640 lists organizations that the individual interacts with or manages through the PRM system. The organizations that are contained in the personal provider directory may be durable, meaning they interact periodically with the individual (e.g., with monthly statements or bills), or episodic, meaning they interact sporadically with the individual (e.g., through random communications). The personal provider directory 640 displays for each organization a name 647 and a label 648 characterizing the organization. In some embodiments, the PRM system distinguishes in the personal provider directory 640 those organizations that participate in the PRM system from those organizations that do not participate in the PRM system. Organizations may be distinguished by, for example, highlighting, bolding, or otherwise labeling the organizations differently.

The individual can select an organization from the personal provider directory 640 to view more details about the organization. For example, in FIG. 6A, the individual has selected Time Warner Cable, an organization that does not participate in the PRM system. When selected, the PRM system displays detailed information about the individual's relationship with the organization in an overview region 641. Even if an organization does not participate in the PRM system, the individual can enter information related to the organization and the individual's relationship with the organization. Thus, in FIG. 6A, the PRM system shows the individual's account information associated with Time Warner Cable, including secure account information 642 and other account information 644. The PRM system also allows an individual to add notes related to his or her relationship with the organization in a notes section 646.

Figure 6B:
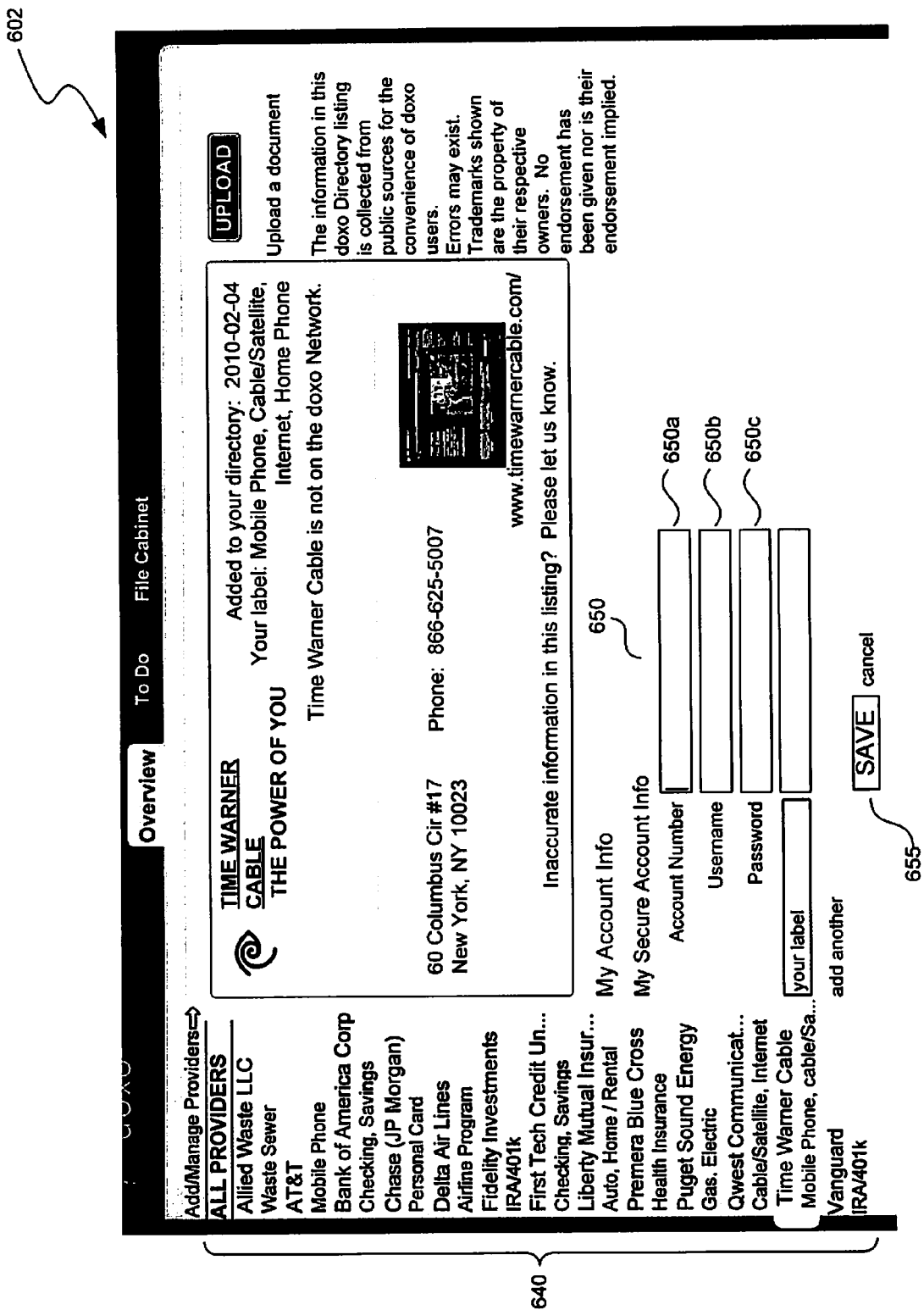

If the individual elects to input secure account information that is related to an organization, the provider relationship management system 10 generates a form that allows the individual to enter the information. FIG. 6B is a representative user interface 602 generated by the PRM system in response to an individual that has selected to input secure account information. The PRM system generates input fields 650, including an account number field 650a, a username field 650b, and a password field 650c. An individual enters his account information via the input fields 650. When the individual has entered all account information, the individual causes the information to be stored by the PRM system by selecting a "save" button 655. The individual may enter the account information into the personal provider directory to maintain a record of all of the individual's account information in a single, convenient location. In some embodiments, however, once an organization joins the PRM system, the PRM system may also use the secure account information to access an account associated with the individual in systems and data areas of the organization. In this example, if the individual accurately enters his account information and Time Warner joins the PRM system, the PRM system may connect to the individual's account in systems and data areas associated with Time Warner.

Figure 7:
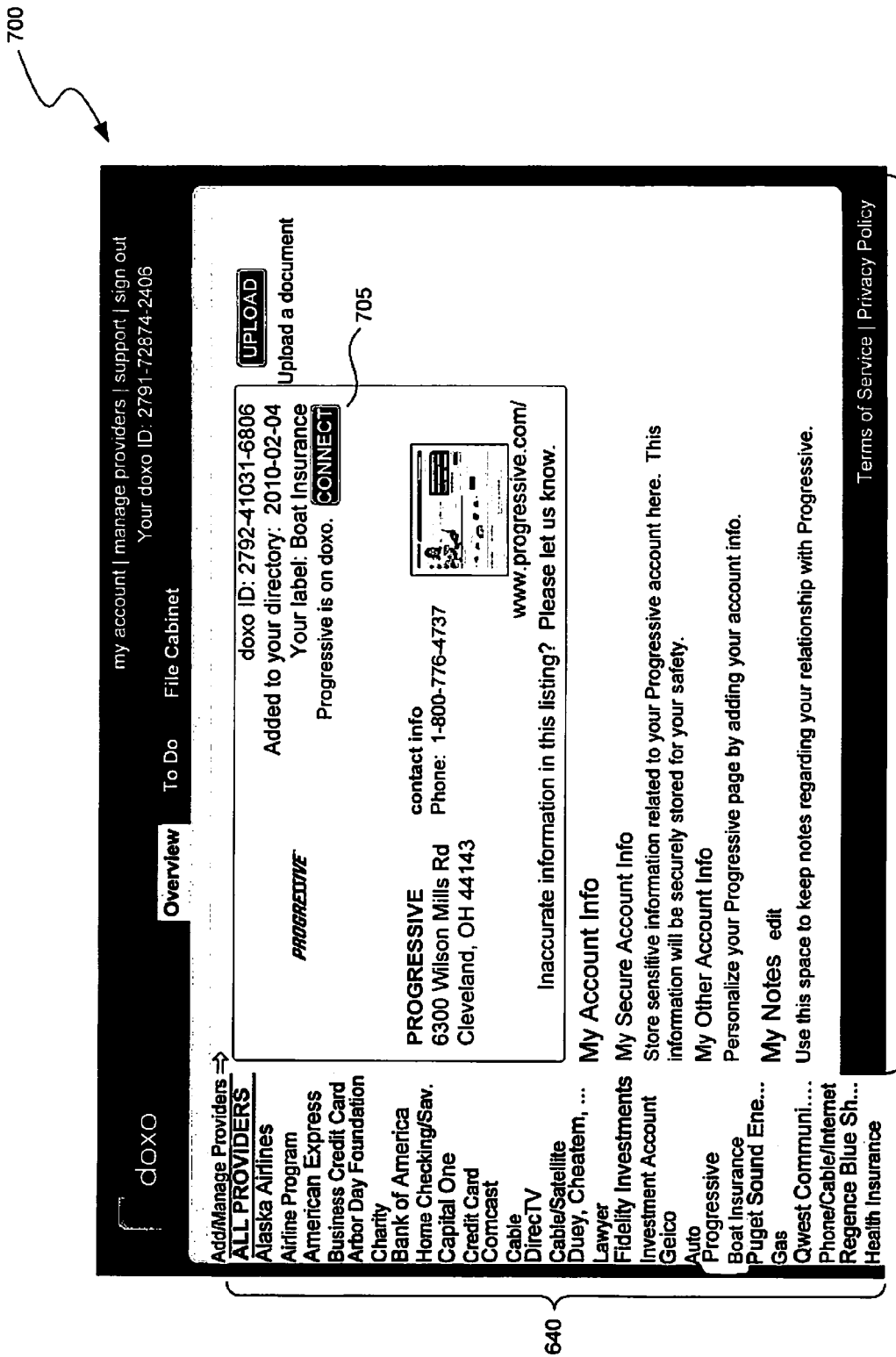
FIG. 7 is a representative user interface that is generated by the provider relationship management system to allow an individual to utilize a personal provider directory listing to establish an interactive connection with an organization.

An individual may not have established an interactive connection with an organization in their personal provider directory if the organization was not a participant in the PRM system when it was added to the personal provider directory, or if the individual merely chose not to request an interactive connection when adding the organization to the directory. The individual may want to subsequently request the establishment of an interactive connection with an organization if, for example, the organization later joins the PRM system, or the individual regrets not establishing the interactive connection when the organization was added to his or her personal provider directory. If an individual selects from the individual's personal provider directory 640 an organization that participates in the PRM system but with which the individual is not interactively connected, the PRM system 10 therefore displays an option for the individual to establish an interactive connection with the organization. FIG. 7 is a representative user interface 700 generated by the provider relationship management system 10 that shows a personal provider directory 640. In FIG. 7, the individual has selected Progressive, an organization that participates in the PRM system but with which the individual is not interactively connected. The PRM system displays detailed information about the individual's relationship with the organization and a "connect" button 705 in the overview region 641. An individual may select the connect button 705 to establish an interactive connection between the individual and the organization. If the individual selects the connect button 705, the PRM system generates an interface to allow the individual to submit information that the organization can use to identify the individual's account with the organization and/or verify the individual's identify, such as the representative user interface depicted in FIG. 5C. If an individual selects to establish an interactive connection with an organization and the individual has already stored secure account information or other identifying information with the PRM system, the PRM system automatically uses the stored identifying information to send a request to the organization to establish an interactive connection between that individual and the organization.

In some embodiments, the PRM system presents one or more communication options (not shown) on the personal provider directory to allow the individual to directly communicate with an organization that participates in the PRM system. Communication options may include a chat, email, videoconference, teleconference, or the like, with a person or group (e.g., customer service) associated with the organization. The PRM system stores a record of any communication with an organization, such as a record of emails exchanged with the organization, a transcript of a chat with an organization, or a recording of a videoconference or teleconference that was conducted between an individual and the organization. By storing a record of a communication with an organization, an individual is able to review the substance of the communication at a later time.

III. Document Handling

Figure 8:
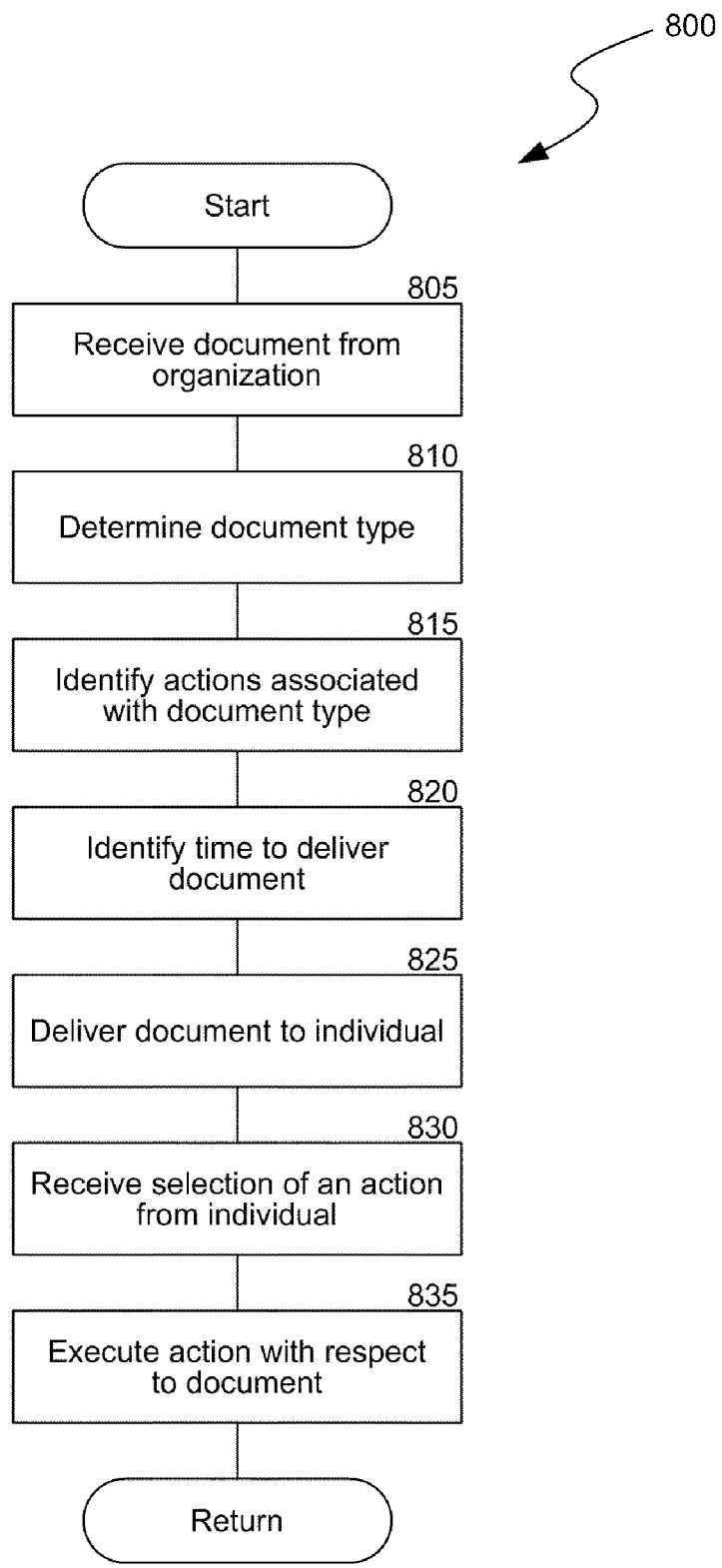
FIG. 8 is flow diagram depicting steps performed by the provider relationship management system to receive a document from an organization and allow an individual to take an action with respect to the document.

Once an individual has established an interactive connection with an organization, the organization can send documents to the individual. The individual, upon receiving a document, is allowed to view the document and take one or more actions with respect to the document. The allowed actions are constrained, however, based on the type of document that is received. FIG. 8 is a flow chart of a process 800 implemented by the provider relationship management system 10 when an organization sends a document to an individual and the individual takes an action with respect to the document. At a block 805, the provider relationship management system 10 receives a document from an organization. The organization submits the document via an application program interface (API) specified by the PRM system, by copying the document to a location in data areas associated with the organization that the PRM system can access, or by other methods, such as by emailing the document to an email address associated with the PRM system. The document may be submitted in a variety of formats, such as a .pdf file, a .jpg file, an .htm file, a .doc file, raw data, or the like. For tracking purposes, the PRM system assigns a unique identifier to each received document, which allows the PRM system to associate the document with the sending organization and the recipient individual or individuals.

Every document that is communicated via the provider relationship management system 10 is associated with a document type. A document can be of a pre-defined type or a custom type. Pre-defined document types include a pay document, a review document, a respond document, and an offer document. A pay document, such as a bill, is a demand from an organization that an individual pay money to the organization or to another organization. A review document, such as a receipt or tax statement, is a request from an organization that an individual review information. A respond document, such as a form, is a request from an organization that an individual send information to the organization. An offer document, such as an advertisement for services, is an offer from an organization that an individual can accept. Custom document types are defined on an ad-hoc basis by an organization to meet the needs of the organization. Each document type, whether pre-defined or custom, is associated with a different combination of actions that an individual can take with respect to the document. The PRM system does not allow actions that are not associated with the document type to be performed by an individual. While four pre-defined document types are disclosed herein, it will be appreciated that the PRM system may recognize more, fewer, or different pre-defined document types.

At a block 810, the provider relationship management system 10 examines the document and/or metadata associated with the document to determine a document type. The type of document may be expressly encoded in the metadata associated with the document. For example, a document that is a monthly statement of charges from a telecommunications provider may contain a piece of metadata that classifies the document as a "pay document." If a document does not have an expressly-coded indication of the document type, the PRM system 10 may be able to infer the type of document from the contents of the document. For example, a monthly statement of charges from a service provider may indicate an "amount due" and a "pay by date." When these phrases are detected by the PRM system as being contained in a document, the PRM system may infer that the document is a "pay document" and treat the document as such. If the PRM system 10 is unable to determine the type of document based on an express or inferred encoding of the document, the PRM system may classify the document as a miscellaneous document and provide a broad range of actions that are allowable for the document. Alternatively, the PRM system may reject the document and require the organization to resubmit the document with a proper indication of document type.

At a block 815, the provider relationship management system 10 identifies actions that an individual can take with respect to the document. The PRM system maintains a table of document types and allowed actions that are associated with each document type. If the document is a pre-defined type, the actions that an individual can take with respect to the document are limited to a predetermined set of actions that are defined by the operator of the PRM system. If the document is a custom type, the actions that an individual can take with respect to the document are limited to a predetermined set of actions that are defined by the organization that generated the custom document type. For example, if an individual receives a pay document from an organization, such as a bill, the actions allowed by the PRM system may restrict the individual to paying the organization, filing the document, or shredding (i.e., discarding) the document. If an individual receives a respond document, such as a request from an organization for personal information about the individual, the PRM system may only allow the individual to respond to the document, file the document, or shred the document. If an individual receives a review document, such as a policy update to an insurance policy, the PRM system may only allow the individual to file the document or shred the document. If an individual receives an offer document, such as an advertisement for a service provided by the organization, the PRM system may only allow the individual to accept the offer, file the document, or shred the document. In some embodiments, a pay document, a review document, a respond document, and an offer document are associated with other, fewer, or additional actions. For example, in some embodiments, the PRM system allows an individual to respond to a pay document in order to challenge an amount that an organization contends the individual owes. In some embodiments, another action besides pay, file, shred, respond, accept, or review is associated with a document. For example, if an individual receives a document that requests a donation, such as a request for donations from a charitable organization, the PRM system allows an individual to pledge money to the organization.

At a block 820, the provider relationship management system 10 identifies when to deliver the document to the individual. To determine a delivery time and date, the PRM system examines metadata associated with the document. In some embodiments, the organization specifies a date and time when the individual can view the document. Specifying a date and time for delivery of a document allows an organization to efficiently submit documents in bulk to the operator of the PRM system, but have the documents delivered in a time-controlled fashion to the intended recipients. In some embodiments, the organization specifies that the PRM system should deliver the document to the individual as soon as possible.

Figure 9:
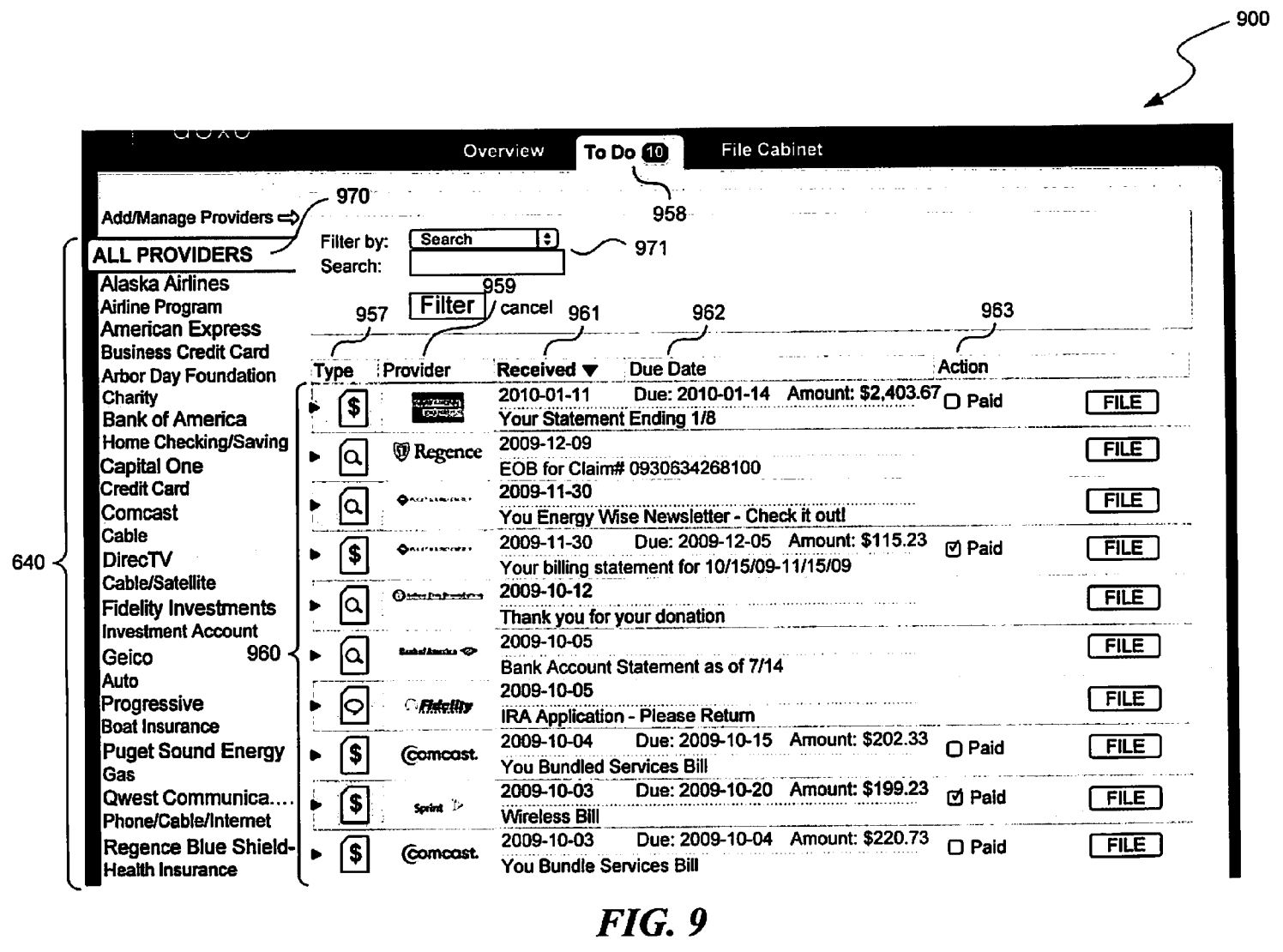

At a block 825, the provider relationship management system 10 delivers the document to the individual at the time identified at block 820. FIG. 9 is a representative user interface 900 that is generated by the PRM system and used by an individual to review received documents. To view documents, an individual selects a "To Do" tab 958 that is accessible from the individual's personal provider directory 640. By selecting an "All Providers" menu item 970, the individual views all documents that have been received from organizations with which the individual has established an interactive connection. Rather than seeing documents from all organizations, the individual may select a specific organization from the personal provider directory 640 to view only documents that were received from that organization.

The provider relationship management system 10 generates a document review list 960 that details the documents that have been sent to the individual from the selected organization or organizations. Each line in the document review list 960 corresponds to a document or set of documents that were received from an organization (or in some cases, a group of related organizations). Each column in the document review list 960 provides data that characterizes the received documents. For example, the document review list 960 includes a type column 957, a provider column 959, a received column 961, a due date column 962, and an action column 963. The type column 957 includes a graphical icon that depicts the type of document that has been received and the provider column 959 preferably includes a logo of the sending organization. The use of graphical icons and logos allows an individual to quickly assess the importance of the received documents. The received column 961 and due data column 962 provide the individual with important timing information for those documents that are time sensitive. As will be discussed in greater detail herein, the action column 963 presents a summary of the actions that are available and/or that have been taken by the individual with respect to each document. The individual can select a column to sort the documents according to the data that describes the documents. If the individual selects the type column 957, for example, the PRM system sorts the document review list 960 according to document type. The PRM system also generates a search field 971 that allows the individual to search through received documents using one or more keywords.

Figure 10:
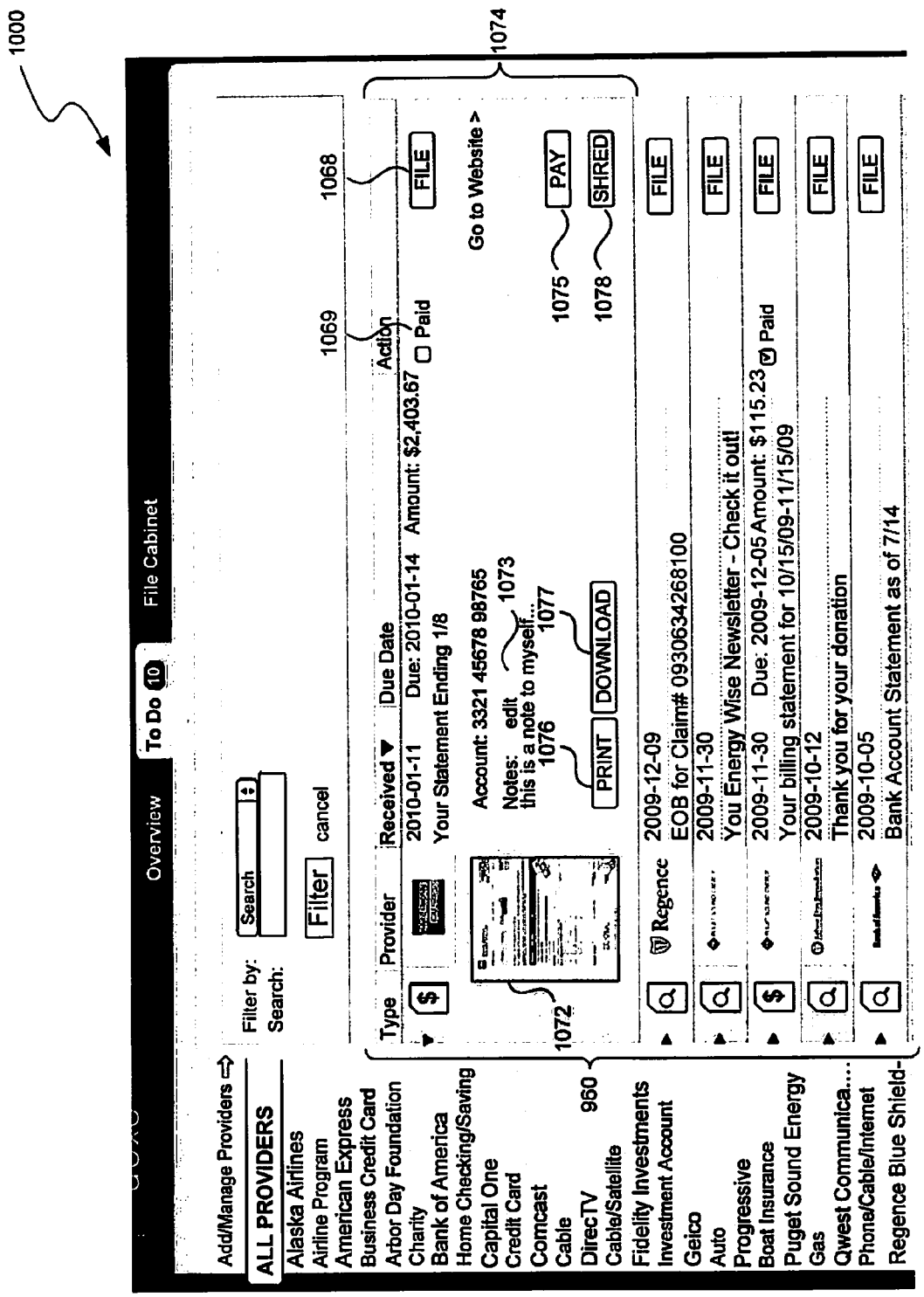
FIG. 10 is a representative user interface that is generated by the provider relationship management system depicting a document details area for a pay-type document.

The individual can select a document from the document review list 960 to view more information about the document, to view the document, and to take an action with respect to the document. FIG. 10 is a representative user interface 1000 that is generated by the provider relationship management system 10 after the individual has selected to view more information about a document sent by an organization. In the example depicted in FIG. 10, the document is a pay document and the sending organization is American Express. The PRM system generates a document details area 1074 within the document review list 960 to show additional details related to the document or the sending organization. For example, the PRM system generates a notes section 1073 that the individual can edit to record information that then becomes associated with the document. The PRM system generates a print button 1076 and a download button 1077, that allow the individual to print the document or download the document to the individual's computing device. The PRM system also generates a thumbnail image 1072 of the document that the individual selects to view the document.

Within the document details area 1074, the provider relationship management system 10 lists actions that the individual can take with respect to the document. For example, because American Express sent the individual a pay document, the PRM system provides a file button 1068, a pay button 1075, and a shred button 1078, each of which corresponds to an action associated with the pay document. Selecting the file button 1068 causes the document to be stored in an archival storage area (the "File Cabinet"). Filing the document causes the document to be removed from the individual's "To Do" list, but allows the document to be subsequently accessed by the individual if necessary. Selecting the pay button 1075 causes the corresponding billed amount to be paid to the organization. And selecting the shred button 1078 causes the document to be discarded in a manner that it cannot be retrieved by the individual.

Returning to FIG. 8, at a decision block 830, the provider relationship management system 10 receives a selected action from the individual with respect to the document. As discussed earlier, actions that are available for a document depend on the document's type. In the example from FIG. 10, the individual can take an action with respect to the pay document sent by American Express by selecting the file button 1068, the pay button 1075, or the shred button 1078.

At a block 835, the provider relationship management system 10 executes the action selected by the individual. In some embodiments, the PRM system asks the individual for more information about his selection or for further instructions. For example, if an individual selects to pay in response to a pay document, the PRM system may prompt the individual for payment information, such as a credit card number. (Alternatively, the PRM system may pay the outstanding amount using stored payment information that was previously provided by the individual.) Similarly, if an individual selects to file a review document, the PRM system may display an interface to the individual to allow the individual to select a folder name in which to file the review document. In some embodiments, if the individual has taken an action with respect to a document, the PRM system displays an indication that identifies that the action has been taken. For example, the PRM system may display a check mark in a paid check box 1069 if the individual selected to pay in response to a pay document.

Figure 11:
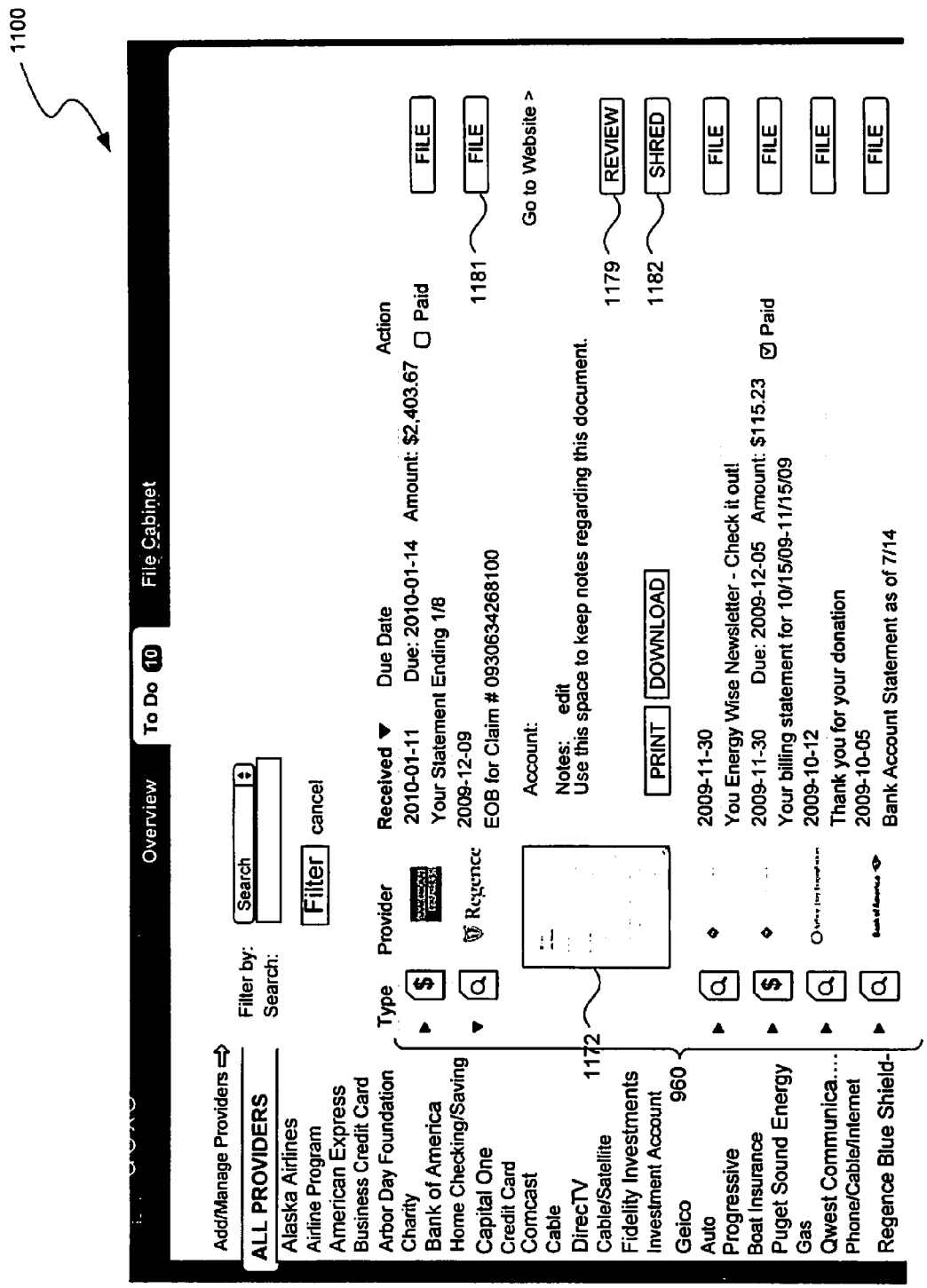
FIG. 11 is a representative user interface that is generated by the provider relationship management system depicting a document details area for a review-type document.

FIG. 11 is a representative user interface 1100 that is generated by the provider relationship management system 10 after an individual has selected a review document. In the depicted example, Regence has sent the individual an explanation of benefits document. The individual takes an action with respect to the review document by selecting a file button 1181, a review button 1179, or a shred button 1182. If the individual selects the review button 1179 or clicks on a thumbnail image 1172 of the document, the PRM system displays the document using an appropriate document reviewing application (e.g., Microsoft Word®, Adobe Acrobat®). The PRM system may display the document within a web browser or the document may be downloaded to a computer or other device that the individual uses to access the PRM system. In some embodiments, the PRM system transmits a message to an organization when an individual has opened a review document that the organization sent. The message may provide a timestamp of when the individual opened the review document, and an indication of any action that the individual took after opening.

Figure 12:
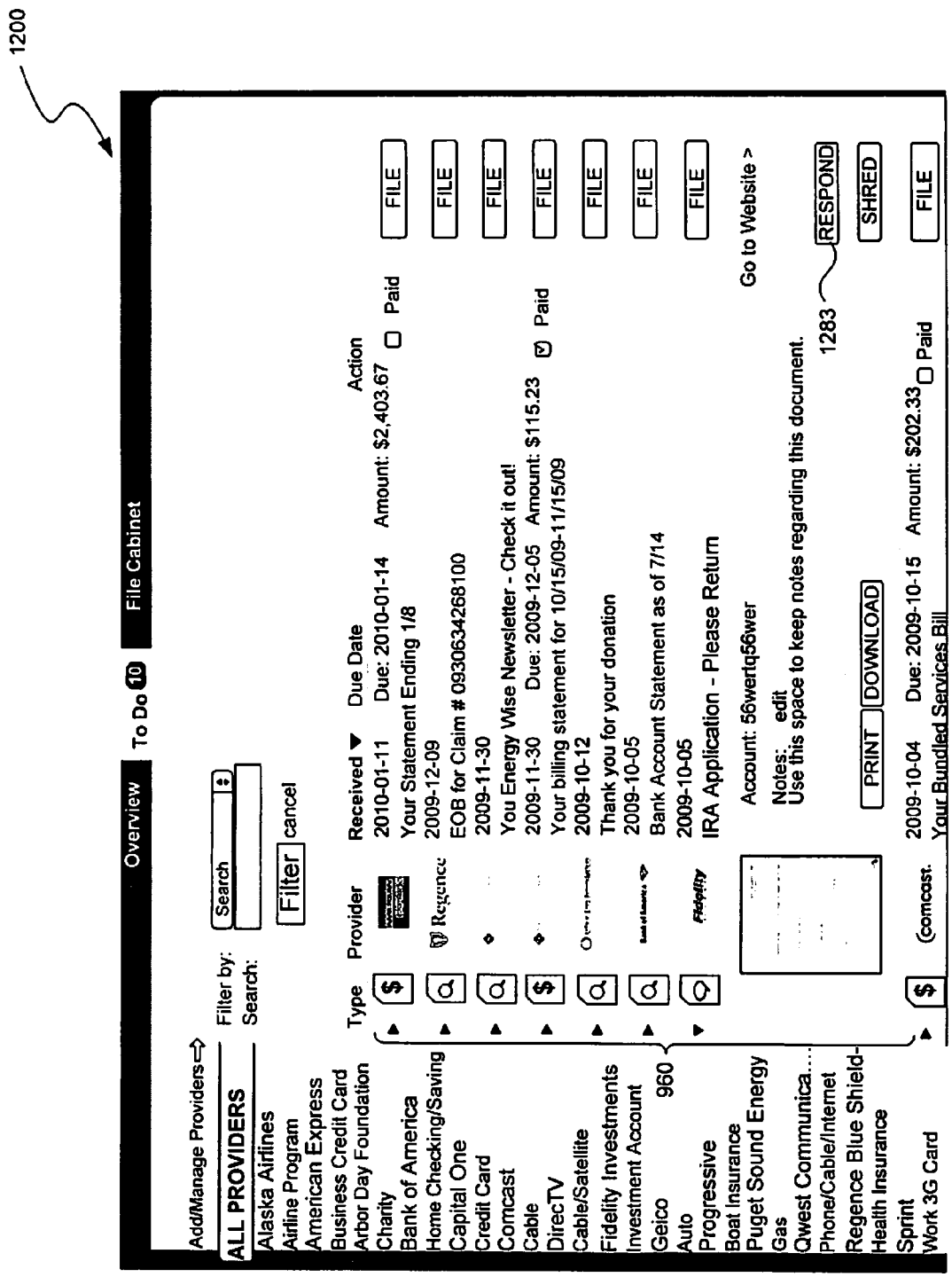
FIG. 12 is a representative user interface that is generated by the provider relationship management system depicting a document details area for a respond-type document.

FIG. 12 is a representative user interface 1200 that is generated by the provider relationship management system 10 after an individual has selected to view a respond document. In the depicted example, Fidelity has sent the individual an Individual Retirement Account (IRA) application. The PRM system generates, among other buttons, a respond button 1283. If the individual selects the respond button, the PRM system opens the IRA application in a web browser window using an appropriate document editing application (e.g., Microsoft Word®, Adobe Acrobat®). The individual is allowed to input information into the IRA application and then submit the completed application to the organization through the PRM system.

In some embodiments, an organization sends a package to an individual through the provider relationship management system 10. A package is a collection of two or more documents, which can all be of the same document type or of different types. For example, a university that interacts with a student over the PRM system can send the student a package consisting of a tuition bill (a pay document), a tax receipt (a review document), and an advertisement for its basketball team (a review document). The student views each of the individual documents and can take an action with respect to each of the documents separately. For example, the student can pay the tuition bill, file the tax receipt, and discard the basketball advertisement.

Figure 13:
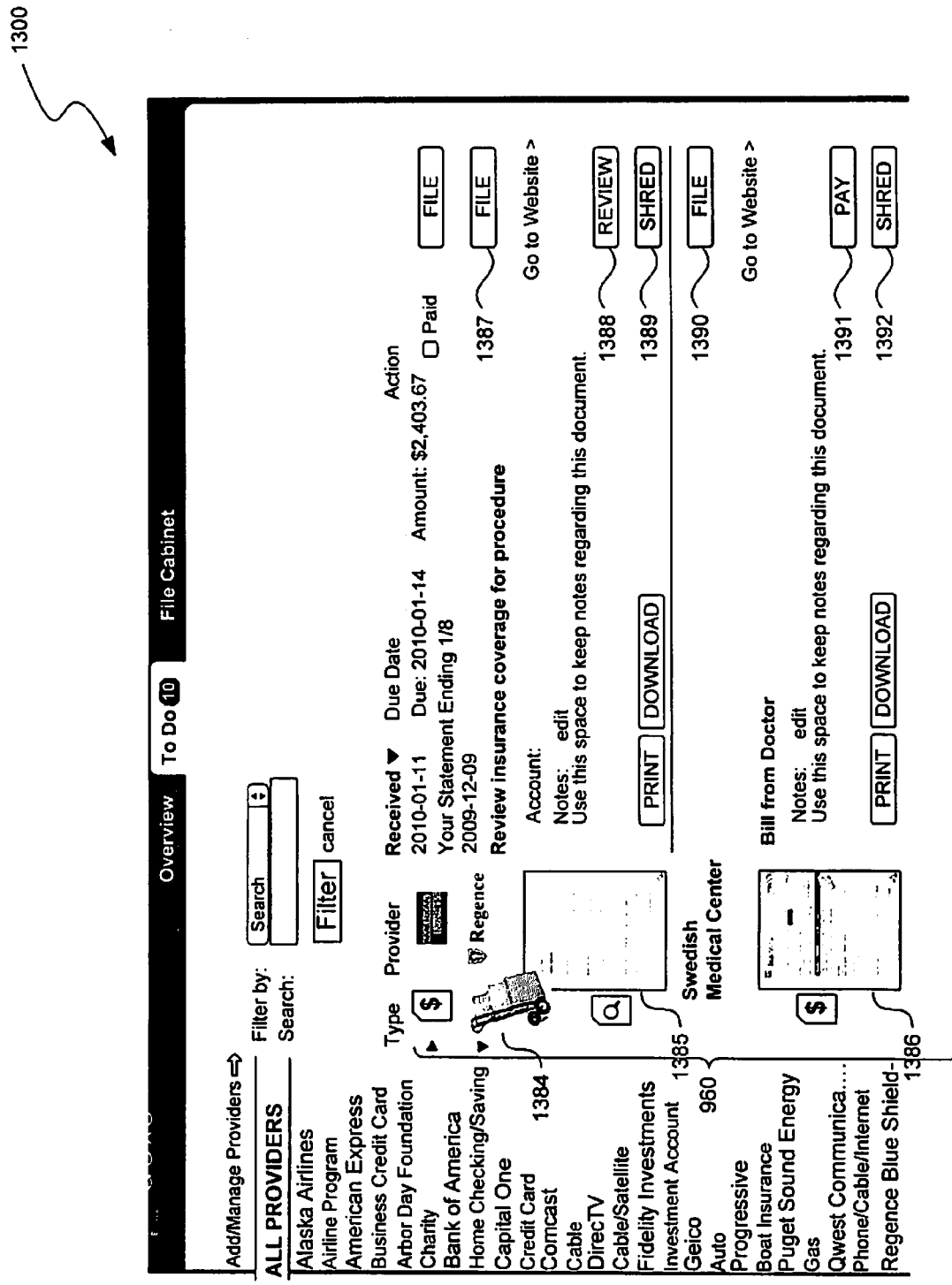
FIG. 13 is a representative user interface that is generated by the provider relationship management system depicting a package of documents.

In some embodiments, two or more organizations in association with each other can send a package of documents to an individual. FIG. 13 is a representative user interface 1300 that is generated by the provider relationship management system 10 when an individual receives a package sent by two organizations. The PRM system displays a package symbol 1384 to identify the package. When the package is selected by the recipient, the package is opened to show two documents: a review document 1385 and a pay document 1386. The documents are sent by two different organizations but packaged together because the documents are related. In the depicted example, an insurance company, Regence, sent the individual a review document 1385 that details the portion of a medical bill the insurance company is covering. The individual can select a file button 1387 to file the document, a review button 1388 to review the document, or a shred button 1389 to discard the document. In the package with the insurance document, Swedish Medical Center included a bill (a pay document) for the remaining balance of the medical bill that Regence did not cover. The individual can select a file button 1390 to file the bill, a pay button 1391 to pay the bill, or a shred button 1392 to discard the bill.

In some embodiments, an individual is allowed to construct a rule that the provider relationship management system 10 automatically follows when the individual receives a document that meets the criteria specified by the rule. For example, the individual can request that the PRM system send the individual an email when he receives any pay document. In some embodiments, the individual sets different rules for different types of documents or for documents received from different organizations. For example, the individual can create a rule that instructs the PRM system to automatically pay a bill sent from a cable television provider, but to send the individual an email if the individual receives a bill from a credit card company. In some embodiments, the individual can create a rule that instructs the PRM system to pay a bill only if it is within a certain value range.

In some embodiments, the provider relationship management system 10 gathers data related to an action taken by an individual with respect to a document. The PRM system stores data associated with the action, including, for example, data identifying the document (i.e., a unique document identifier), data related to a duration of time between when the document was sent to the individual and when the individual took an action on the document, and data reflecting the action taken by the individual (e.g., payment). The PRM system may aggregate data reflecting document actions across groups of individuals, types of documents, and organizations. For example, the PRM system may generate and provide a report to a telecommunications company that shows the average amount of time that subscribers of the telecommunications company take to pay their bills as compared to the average amount of time that subscribers of all telecommunications company take to pay their bills.

In some embodiments, the provider relationship management system 10 provides a control that allows an individual to upload a document to the PRM system and sends it to an organization. For example, the PRM system may allow an individual to upload and submit an application for a credit card over the PRM system. In some embodiments, the PRM system maintains a calendar for an individual that includes important events associated with the individual, such as dates that pay documents are due.

Those skilled in the art will appreciate that the actual implementation of a data storage area may take a variety of forms, and the phrase "data storage area" is used herein in the generic sense to refer to any area that allows data to be stored in a structured and accessible fashion using such applications or constructs as databases, tables, linked lists, arrays, and so on. Those skilled in the art will further appreciate that the depicted flow charts may be altered in a variety of ways. For example, the order of the blocks may be rearranged, blocks may be performed in parallel, blocks may be omitted, or other blocks may be included.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method for delivering an electronic document to an individual and performing an action that is specified by the individual with respect to the electronic document, the method performed by a computing system having a processor and a memory, the method comprising:

maintaining, by the computing system, definitions of a plurality of document types, each definition specifying one or more allowed actions that are permitted to be taken by an individual in conjunction with an associated document type;

receiving an electronic document from a sending organization that is addressed to an individual, wherein the received electronic document is of a document type;

comparing, by the computing system, the document type of the received electronic document with the definition of the document type maintained by the computing system in order to identify the one or more allowed actions associated with that document type;

presenting the received electronic document to the addressed individual;

presenting to the individual the one or more allowed actions associated with the document type of the received electronic document;

receiving from the individual a selected action from the one or more allowed actions; and performing the selected action on the received electronic document.

2. The method of claim 1, wherein the electronic document is only presented to the addressed individual if the addressed individual has affirmatively indicated a willingness to receive electronic documents from the sending organization.

3. The method of claim 1, wherein the document type is a pay document, and wherein an allowed action is to transfer monetary value to the sending organization.

4. The method of claim 1, wherein the document type is a respond document, and wherein an allowed action is to provide responsive information to the sending organization.

5. The method of claim 1, wherein the document type is an offer document, and wherein an allowed action is to accept an offer associated with the received electronic document.

6. The method of claim 1, wherein the document type is a review document, and wherein an allowed action is to display the received electronic document to the individual.

7. The method of claim 1, wherein the document type is a custom document type, and wherein the sending organization specifies the definition of the custom document type.

8. The method of claim 1, further comprising notifying the sending organization when the selected action is performed on the received electronic document.

9. The method of claim 1, wherein the document type is specified in metadata associated with the document.

10. The method of claim 1, wherein the document type is determined by:

analyzing the contents of the document; and ascertaining the document type from the contents of the document.

11. The method of claim 1, wherein the received electronic document further has an associated delivery time, and wherein the received electronic document is presented to the addressed individual at a time no earlier than the associated delivery time.

12. A system for delivering an electronic document to an individual and perform an action specified by the individual with respect to the electronic document, the system comprising:

a memory storing computer-executable instructions of:

a document management module that is configured to:

maintain definitions of a plurality of document types, each definition specifying one or more allowed actions that are permitted to be taken by an individual in conjunction with an associated document type;

receive an electronic document from a sending organization that is addressed to an individual, wherein the received electronic document is of a document type; and compare the document type of the received electronic document with the definition of the document type in order to identify the one or more allowed actions associated with that document type;

a user interface module that is configured to:

present to the addressed individual the received electronic document and the one or more allowed actions associated with the document type of the received electronic document; and receive from the individual a selected action from the one or more allowed actions; and an interaction management module that is configured to perform the selected action on the received electronic document after the selected action from the individual is received; and a processor for executing the computer-executable instructions stored in the memory.

13. The system of claim 12, wherein the memory further includes computer-executable instructions of a user account module that contains an indication of whether the addressed individual has indicated a willingness to receive electronic documents from the sending organization, wherein the user interface module is further configured to present the electronic document to the addressed individual only if the addressed individual has affirmatively indicated a willingness to receive electronic documents from the sending organization.

14. The system of claim 12, wherein the document type is a pay document, and wherein an allowed action is to transfer monetary value to the sending organization.

15. The system of claim 12, wherein the document type is a respond document, and wherein an allowed action is to provide responsive information to the sending organization.

16. The system of claim 12, wherein the document type is an offer document, and wherein an allowed action is to accept an offer associated with the received electronic document.

17. The system of claim 12, wherein the document type is a review document, and wherein an allowed action is to display the received electronic document to the individual.

18. The system of claim 12, wherein the document type is a custom document type, and wherein the sending organization specifies the definition of the custom document type.

19. The system of claim 12, wherein the interaction management module is further configured to notify the sending organization when the selected action is performed on the received electronic document.

20. The system of claim 12, wherein the document management module is further configured to determine the document type by interpreting metadata associated with the document.

21. The system of claim 12, wherein the document management module is further configured to determine the document type by:

analyzing the contents of the document; and ascertaining the document type from the contents of the document.

22. The system of claim 12, wherein the received electronic document further has an associated delivery time, and wherein the user interface module is further configured to present the received electronic document to the addressed individual at a time no earlier than the associated delivery time.

23. A computer-readable storage medium encoded with instructions that, when executed by a processor, cause the processor to implement a method for delivering an electronic document to an individual and performing an action that is specified by the individual with respect to the electronic document, the method comprising: maintaining definitions of a plurality of document types, each definition specifying one or more allowed actions that are permitted to be taken by an individual in conjunction with an associated document type;
    receiving an electronic document from a sending organization that is addressed to an individual, wherein the received electronic document is of a document type;
    comparing the document type of the received electronic document with the definition of the document type in order to identify the one or more allowed actions associated with that document type;
    presenting to the addressed individual the received electronic document and the one or more allowed actions associated with the document type of the received electronic document, provided that the addressed individual has affirmatively indicated a willingness to receive electronic documents from the sending organization;
    receiving from the individual a selected action from the one or more allowed actions; and
    performing the selected action on the received electronic document.

24. The computer-readable storage medium of claim 23, wherein the method further comprises notifying the sending organization when the selected action is performed on the received electronic document.

25. The computer-readable storage medium of claim 23, wherein the document type is specified in metadata associated with the document.

26. The computer-readable storage medium of claim 23, wherein the document type is determined by:
    analyzing the contents of the document; and
    ascertaining the document type from the contents of the document.

27. The computer-readable storage medium of claim 23, wherein the received electronic document further has an associated delivery time, and wherein the received electronic document is presented to the addressed individual at a time no earlier than the associated delivery time.

\* \* \* \* \*

UNITED STATES PATENT AND TRADEMARK OFFICE
CERTIFICATE OF CORRECTION

| | | |
|---|---|---|
| PATENT NO. | : 8,311,938 B2 | Page 1 of 1 |
| APPLICATION NO. | : 12/712181 | |
| DATED | : November 13, 2012 | |
| INVENTOR(S) | : Steve Shivers et al. | |

It is certified that error appears in the above-identified patent and that said Letters Patent is hereby corrected as shown below:

On title page, item 56, under "OTHER PUBLICATIONS", in column 2, line 1, Delete "Internation" and insert -- International --, therefor.

In column 23, line 12, in claim 23, delete "comprising:maintaining" and insert -- comprising: maintaining --, therefor.

Signed and Sealed this
Twenty-sixth Day of February, 2013

Teresa Stanek Rea
*Acting Director of the United States Patent and Trademark Office*